(12) United States Patent
Miller et al.

(10) Patent No.: US 11,654,790 B2
(45) Date of Patent: May 23, 2023

(54) COMPUTING SYSTEMS AND METHODS FOR CONTROLLING CURRENT IN VEHICLE MOTORS

(71) Applicant: Tomcar Holding Company LLC, Phoenix, AZ (US)

(72) Inventors: Moshe Miller, Rehovot (IL); Jonathan Drori, Kibbutz Zikim (IL)

(73) Assignee: Tomcar Holding Company LLC, Phoenix, AZ (US)

( * ) Notice: Subject to any disclaimer, the term of this patent is extended or adjusted under 35 U.S.C. 154(b) by 18 days.

(21) Appl. No.: 17/510,029

(22) Filed: Oct. 25, 2021

(65) Prior Publication Data

US 2022/0144102 A1 May 12, 2022

Related U.S. Application Data

(63) Continuation of application No. 16/277,640, filed on Feb. 15, 2019, now Pat. No. 11,155,182.

(51) Int. Cl.
*B60L 58/14* (2019.01)
*B60W 20/13* (2016.01)
*B60W 10/08* (2006.01)

(52) U.S. Cl.
CPC .............. *B60L 58/14* (2019.02); *B60W 10/08* (2013.01); *B60W 20/13* (2016.01)

(58) Field of Classification Search
None
See application file for complete search history.

(56) References Cited

U.S. PATENT DOCUMENTS 7,487,851 B2   2/2009   Buck et al.
10,875,408 B2 * 12/2020   Washizu .................. B60L 1/00

FOREIGN PATENT DOCUMENTS

CN   102403767 A   4/2012
JP   0767211 A   3/1995
(Continued)

OTHER PUBLICATIONS

Curtis Insturments, Inc., Manual 1234/36/38 AC Induction Motor Controllers OS 11 with VCL, 2009, 134 pages.
(Continued)

*Primary Examiner* — Todd Melton
(74) *Attorney, Agent, or Firm* — Lee Sullivan Shea & Smith LLP

(57) ABSTRACT

A motor controller is described that is coupled to a drive motor and a battery pack of a vehicle. The motor controller is configured to determine a maximum discharge current of the battery pack and a rotational velocity of the drive motor. Based on the determined rotational velocity of the drive motor, the motor controller is configured to identify a curve that defines a relationship between the maximum discharge current of the battery pack and a drive current limit of the motor controller. Based on the identified curve and the determined maximum discharge current of the battery pack, the motor controller is configured to determine the drive current limit of the motor controller. The motor controller is further configured to convert a discharge current from the battery pack to a drive current subject to the determined drive current limit and supply the drive current to the drive motor.

20 Claims, 12 Drawing Sheets

(56) References Cited

FOREIGN PATENT DOCUMENTS

JP      2000166009 A    6/2000
KR      20040001263 A   1/2004

OTHER PUBLICATIONS

International Searching Authority International Search Report and Written Opinion dated Jun. 12, 2020, issued in connection with International Application No. PCT/US2020/018451, filed Feb. 14, 2020, 10pages.

* cited by examiner

COMPUTING SYSTEMS AND METHODS FOR CONTROLLING CURRENT IN VEHICLE MOTORS

RELATED APPLICATIONS

This application claims the benefit of priority as a continuation under 35 U.S.C. § 120 to U.S. application Ser. No. 16/277,640 filed Feb. 15, 2019, entitled "Computing Systems and Methods for Controlling Current in Vehicle Motors", the contents of which are hereby incorporated by reference in their entirety for all purposes.

FIELD OF THE DISCLOSURE

The present disclosure relates generally to electric or hybrid electric vehicles and more particularly to control systems for use therein.

BACKGROUND

Vehicles, such as hybrid-electric and all-electric vehicles may include one or more electric drive motors that convert electrical energy into mechanical energy that applies torque to the drive shaft and thereby to the wheels. A drive motor may be powered by various energy sources, such as a battery pack, which supplies direct drive current that a motor controller may convert to an alternating drive current. The motor controller may supply the alternating drive current to the drive motor to cause the drive motor to produce torque that is transferred to the wheels of the vehicle to propel the vehicle forward.

SUMMARY

I. Overview

Increasingly, vehicles, such as fully electric and hybrid-electric ("hybrid") vehicles, are being employed for various applications. Various embodiments will be described that provide various advantages for electric and hybrid vehicles. The features of these various embodiments may be combined with each other in accordance with the desired system requirements. It should be understood that these embodiments may be combined with each other in various combinations.

Additionally, many of the examples and embodiments described herein refer to a motor controller that performs various functions and provides various functionality. According to various implementations and examples, reference is made to a motor controller available from Curtis Instruments of Mt. Kisco, N.Y. and described in "Manual Models 1234, 1236 and 1238 AC Induction Motor Controllers, OS11 with VCL."

At a high level, this disclosure relates to devices, such as a motor controller, that may be configured to control the delivery and conversion of power from a battery pack to a drive motor of a vehicle. Such improvements more specifically involve controlling the current and voltage that a motor controller supplies to an electric motor (referred to herein as a "drive motor") of an electric or hybrid-electric vehicle, and more particularly, to controlling 3-phase AC (alternating current) voltage and AC current that the motor controller supplies to the drive motor and converts from a direct discharge current supplied by the battery pack. The techniques described herein may provide various improvements in the performance characteristics of vehicles that include an electric motor.

A motor controller for an electric or hybrid-electric vehicle may control various components of the vehicle, such as the vehicle's controls (e.g., steering, braking, transmission, and other controls) and the vehicle's driving means (e.g., an engine or motor). The motor controller may generally include a computing device that executes program instructions that cause the motor controller to receive inputs and to control various components and systems of the vehicle. As examples, the motor controller may be coupled to and/or may control a drive motor, a battery pack, and a set driver controls. The motor controller may be coupled to, and may control, various other components of the vehicle as well.

The techniques of this disclosure are generally applicable to vehicles that are equipped with electrical drive motors, such as DC (direct current)- or AC (alternating current)-powered drive motors.

According to one example, a vehicle may be equipped with a DC motor controller that controls the supply of power from a battery pack to the DC drive motor. The power that the DC motor controller supplies to the DC drive motor may take the form of a current and voltage. The motor controller may vary parameters of the DC voltage and current to control the speed of the drive motor and the torque generated by the drive motor.

In an example where the vehicle is equipped with an AC-powered drive motor, the motor controller may be programmatically configured to control the conversion of the direct battery discharge current to a 3-phase AC voltage waveform consisting of three sinusoidal waveforms that are electrically displaced by 120° that the motor controller supplies to the drive motor and when supplied, causes the drive motor to generate torque that is then applied to the vehicle's wheels.

As a part of the DC-to-AC conversion process, the motor controller may vary parameters of the 3-phase AC voltage and AC current produced during the conversion, and in this way control the speed of the drive motor and the torque generated by the drive motor.

The RMS (root mean squared) drive current that the motor controller applies to the drive motor may be proportional to the amount of torque that the drive motor generates. For instance, if the motor controller supplies a low RMS drive current, the drive motor may generate a relatively low amount of torque. Conversely, if the motor controller supplies a high RMS drive current, the drive motor may generate a relatively high amount of torque. However, the process of determining parameters for the RMS drive current and voltage may vary based on a number of different factors, some of which may change in real-time.

As one example, the process of determining the parameters of the RMS drive voltage and drive current may vary depending on the maximum discharge current that the battery pack can produce at the current time (i.e., the charge level of the battery pack). In some implementations, the motor controller may determine the maximum discharge current of the battery pack, and based on the maximum discharge current, may determine a corresponding limit on the RMS drive current that the motor controller may supply to the drive motor.

For example, if the battery pack has a maximum discharge current of 200 amps, the motor controller may set a limit on the maximum RMS drive current that the motor controller may supply to the drive motor (referred herein to as the "RMS drive current limit") to 40% of the maximum RMS drive current that the motor controller is capable of supplying to the drive motor. As the maximum discharge current of the battery pack decreases, for instance due to the battery pack's level of charge decreasing, the motor controller may accordingly (e.g., linearly) decrease the RMS drive current limit based on the decreased maximum discharge current of the battery pack. In some implementations, the motor controller could maintain a proportional relationship between the battery pack's maximum discharge current (measured in amps) and the RMS drive current limit.

While a linear relationship between a battery pack's maximum discharge current and the RMS drive current limit might not have many undesirable effects on performance for a vehicle equipped with a relatively large capacity battery pack, the same proportional relationship between a maximum discharge current of a battery pack and the RMS drive current limit of the motor controller may result in undesirable effects on performance for a vehicle that is equipped with a relatively small capacity battery pack. This may be the case, at least in part, because smaller battery packs might not be capable of outputting the same amount of discharge current as larger battery packs while at the same percentage of charge without rapidly discharging the battery pack. Consequently, if a motor controller were configured to use the same proportional relationship between the maximum discharge current of a relatively smaller battery pack and the RMS drive current limit, and the smaller battery pack was at a low level of charge, the smaller battery pack may output a lower drive current than a relatively larger battery pack would output at a similar level of charge. As a result of the smaller maximum discharge current supplied by the relatively smaller battery pack, the motor controller would consequently supply a smaller RMS drive current to the drive motor. The drive motor would, in turn, generate a lower amount of torque than would a larger battery pack, which may constitute unsuitable performance in some scenarios.

For instance, the relatively low amounts of torque that a smaller battery pack may provide at low speeds may be inadequate for various types of driving conditions, such as off-road driving conditions. While operating at low speed in off-road conditions, an off-road vehicle may require the drive motor to output a relatively high tractive effort (i.e., force exerted on a vehicle's wheels), for instance, to overcome grades or obstacles. Further, while high amounts of tractive effort may be required at lower speeds, only moderate amounts of tractive effort may be required at higher speeds.

This disclosure provides several advantages that may address the aforementioned problems. First, a motor controller may be configured to operate in conjunction with battery packs of relatively small capacities while still allowing the drive motor to output high tractive effort at low speeds, thereby allowing a vehicle to be engaged in low-speed operation even with smaller battery pack capacities. Second, this disclosure advantageously allows a drive motor to output moderate tractive effort at high speeds, which results in range extension of the vehicle at higher speed. Third, this disclosure advantageously allows a motor controller to transition between high and moderate tractive effort when the vehicle is between low speeds and high speeds. The techniques of this disclosure may provide other advantages as well.

To provide the advantages described above, the motor controller may be configured to define and/or store a plurality of curves, each of which defines a respective set of relationships between the maximum discharge current values of a vehicle's battery pack, and corresponding RMS drive current limits that define the maximum amount of RMS drive current that the motor controller may supply to the drive motor. Each curve may be valid for a set of operating conditions that the motor controller obtains from various components of the vehicle. These operating conditions may take various forms.

For example, the operating conditions that the motor controller uses to select a given curve from the set of curves may be related to the operation of various components of the vehicle such as the vehicle's battery pack, drive motor, accelerator pedal, etc. For instance, the operating conditions that the motor controller uses to select a given curve may include the rotational speed of the drive motor (e.g., measured in RPM), and/or a charge level of the battery pack at a given time.

According to an implementation, each curve may be valid for a different range of rotational speeds of the drive motor. As an example, a first curve may be valid for a first rotational speed range of the drive motor, such as a low-speed range, and a second curve may be valid for a second, different rotational speed range of the drive motor, such as a high-speed range. While two curves, a high-speed curve and a low speed curve, have been described for the purpose of example, the set of curves may include three or more curves as well.

Once a curve is identified, the operations for determining the RMS drive current limit may take various forms. For example, based on a selected curve, the motor controller may utilize a mapping function to map the maximum discharge current that the battery pack is capable of supplying at a given time to an RMS drive current limit value as defined by the selected curve. In general, the mapped RMS drive current limit specified by the selected curve may be directly related to the maximum discharge current that the battery pack is capable of supplying at a given time.

Over time, as the battery pack's charge level decreases due to the battery pack supplying power that the motor controller converts and supplies to the drive motor, the maximum discharge current that the battery pack can safely supply decreases. A battery management system (BMS) may monitor the battery pack for such changes and may report the maximum discharge current of the battery pack to the motor controller (e.g., via a CANbus, etc.) periodically. Based on receiving an updated maximum discharge current from the BMS, the motor controller may update the RMS drive current limit.

As discussed above, the motor controller may be configured to identify, based on the rotational speed of the drive motor, a curve that defines mappings between maximum discharge current values of the battery pack and RMS drive current limits. However, in some cases, the rotational velocity of the drive motor may not be within any of the rotational speed ranges associated with any curve. In such instances, the motor controller may use the endpoints of the two closest curves to determine the RMS drive current limit. For instance, if the rotational speed of the drive motor falls between an endpoint of a low speed curve and the starting point of a high-speed curve for the maximum discharge current of the battery pack at a given time, the motor controller may determine the RMS drive current limit by interpolating between the endpoint of the low-speed curve and the starting point of the high-speed curve based on the rotational speed of the drive motor.

After determining an RMS drive current limit, the motor controller may then convert the discharge current supplied by the battery pack to an RMS drive current, subject to the RMS drive current limit. The motor controller may then supply the limited (if necessary) RMS drive current to the drive motor. The operations for obtaining the discharge current from the battery pack and converting the discharge current to an RMS drive current, subject to a determined RMS drive current limit, may take various forms.

In some implementations, converting the discharge current from the battery pack to an RMS drive current and supplying the RMS drive current to the drive motor may be performed by the motor controller in response to detecting that the accelerator pedal has been depressed. For example, in response to determining that the accelerator of the vehicle has been depressed, the motor controller may determine a position of the accelerator pedal. In some implementations, the position of the accelerator pedal may correspond linearly to the requested RMS drive current. For instance, depressing the accelerator pedal by 40% may correspond to a request for 40% of the maximum RMS drive current the motor controller can produce. Other relationships between the position of the accelerator pedal and the requested RMS drive current are also possible. Based on the determined position of the accelerator pedal, the motor controller may then determine an amount of RMS drive current that the motor controller applies to the drive motor.

As noted above, the RMS drive current limit may generally correspond to a percentage of the maximum RMS drive current that the drive motor controller is capable of producing. When the motor controller converts the discharge current of the battery pack to an RMS drive current, the motor controller uses the RMS drive current limit, if necessary, to limit the amount of RMS drive current the motor controller produces.

For instance, and for the purposes of the examples discussed herein, a motor controller may be capable of producing a maximum RMS drive current of 650 amps. However, the motor controller may have an RMS drive current limit set to 50%. Due to the RMS drive current limit set to 50% of the maximum RMS drive current, the motor controller limits the produced RMS drive current to 325 amps (i.e., 50% of the maximum RMS drive current that the motor controller is capable of producing). Consequently, if the determined position of the accelerator pedal indicates a request for 80% of the maximum 650 amps of RMS drive current (i.e., 520 amps), the motor controller may limit the provided RMS drive current to 325 amps.

In this way, the motor controller may be configured to execute code that causes the motor controller to limit the load on the battery pack, thereby limiting the battery pack discharge current, the RMS drive current that the motor controller supplies to the vehicle's drive motor, and consequently the torque produced by the motor controller.

Various functions and examples with respect to controlling the current and voltage provided by a battery pack to a drive motor have been described and will be described in greater detail herein. In one aspect, a motor controller coupled to a drive motor and a battery pack of a vehicle is provided. The motor controller further includes at least one processor, a non-transitory computer-readable storage medium, and program instructions stored on the non-transitory computer-readable storage medium that are executable by the at least one processor. The program instructions cause the motor controller to determine a maximum discharge current of the battery pack and determine a rotational velocity of the drive motor. Based on the determined rotational velocity of the drive motor, the motor controller identifies a curve that defines a relationship between the maximum discharge current of the battery pack and a drive current limit of the motor controller. Based on the identified curve and the determined maximum discharge current of the battery pack, the motor controller determines the drive current limit of the motor controller. The program instructions also cause the motor controller to convert a discharge current from the battery pack to a drive current subject to the determined drive current limit, and then supply the drive current to the drive motor.

In another aspect, a tangible, non-transitory computer readable medium is provided. The tangible, non-transitory computer readable medium has stored thereon instructions that, when executed by a processor, cause a motor controller of a vehicle to perform functions. The functions include determining a maximum discharge current of a battery pack coupled to the motor controller and determining a rotational velocity of a drive motor coupled to the motor controller. The functions also include, based on the determined rotational velocity of the drive motor, identifying a curve that defines a relationship between the maximum discharge current of the battery pack and a drive current limit of the motor controller. The functions also include, based on the identified curve and the determined maximum discharge current of the battery pack, determining the drive current limit of the motor controller. The functions also include converting a discharge current from the battery pack to a drive current subject to the determined drive current limit and supplying the drive current to the drive motor.

In another aspect a method of operating a motor controller of a vehicle is provided. The method includes determining a maximum discharge current of a battery pack coupled to the motor controller and determining a rotational velocity of a drive motor coupled to the motor controller. The method also includes, based on the determined rotational velocity of the drive motor, identifying a curve that defines a relationship between the maximum discharge current of the battery pack and a drive current limit of the motor controller. The method also includes, based on the identified curve and the determined maximum discharge current of the battery pack, determining the drive current limit of the motor controller. The method also includes converting a discharge current from the battery pack to a drive current subject to the determined drive current limit and supplying the drive current to the drive motor.

BRIEF DESCRIPTION OF THE DRAWINGS

Features, aspects, and advantages of the presently disclosed technology may be better understood with regard to the following description, appended claims, and accompanying drawings where:

Figure 1:
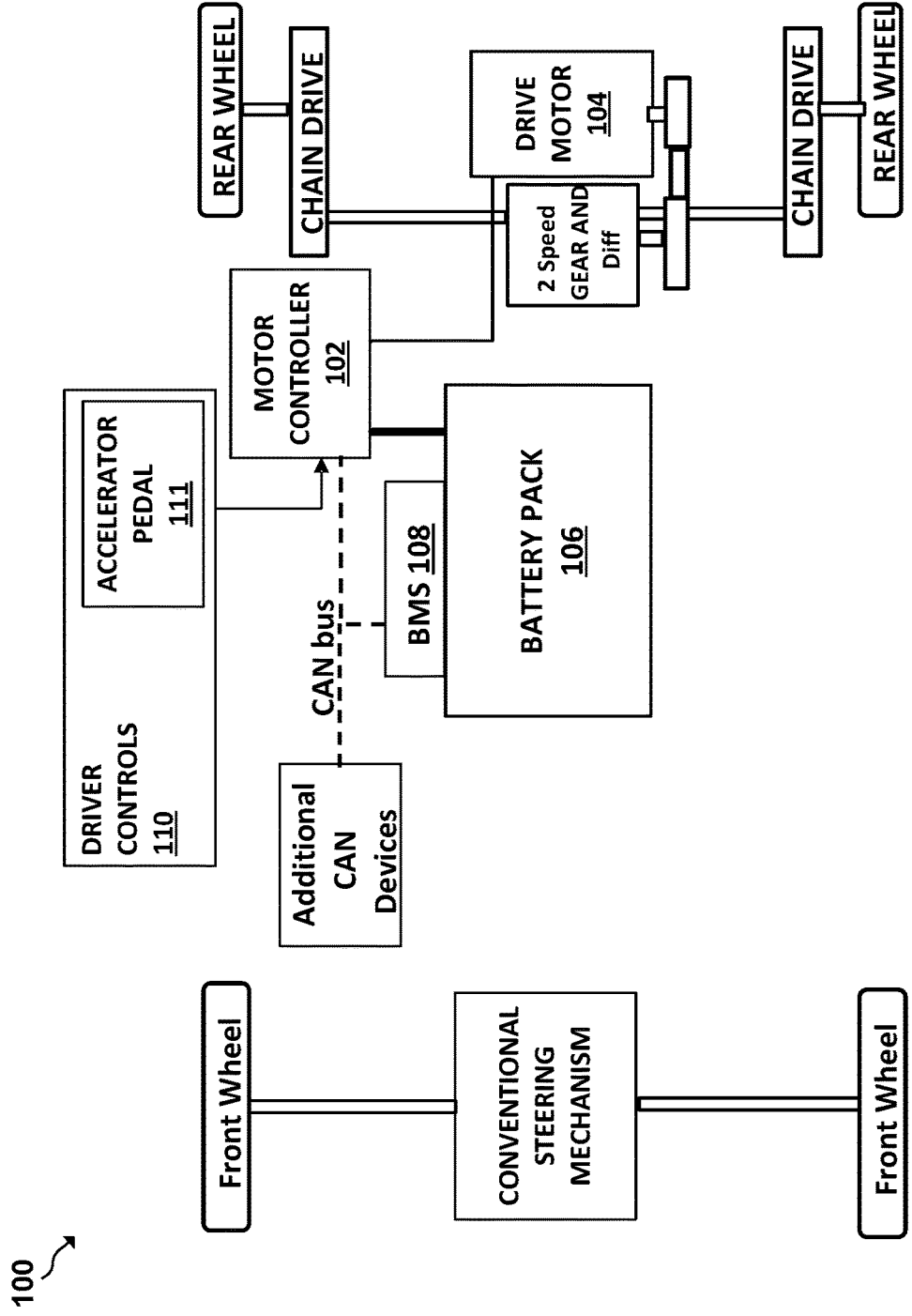
FIG. 1 is a conceptual diagram of a single-axle drive electric vehicle having a single drive motor.

In addition, the drawings are for the purpose of illustrating example embodiments, but it is understood that the present disclosure is not limited to the arrangements and instrumentality shown in the drawings.

DETAILED DESCRIPTION

II. Example Configurations

Referring now to the figures, like numerals may refer to like parts throughout the figures. In general, the figures depict example configurations of vehicles and their components with which the embodiments, implementations, and examples of this disclosure may be implemented.

FIG. 1 shows a conceptual diagram of a single-axle drive electric vehicle 100 having a single-drive motor 104. Vehicle 100 includes front wheels, a conventional steering mechanism coupled to the front wheels, a motor controller 102 that is coupled to the drive motor 104 and a battery management system (BMS) 108 that is in turn coupled to a battery pack 106.

Battery pack 106 is electrically connected to the DC power inputs of motor controller 102, which converts the DC power from battery pack 106 to three-phase AC power accepted by the drive motor 104. According to an example implementation, motor controller 102 may be a Curtis 1238E AC Induction Motor Controller, but may generally comprise any suitable DC or AC motor controller.

Battery pack 106 is also electrically connected to BMS 108, which monitors the battery pack 106 and provides appropriate signals to motor controller 102 to limit the amount of power allocated to drive motor 104, thereby protecting the battery pack 106 from damage. According to one implementation, BMS 108 may comprise an Orion BMS-2, but may take various other forms as well.

Motor controller 102 may be in communication with BMS 108 and/or additional devices that are connected, for example, through a shared communication medium such as a CANbus. Motor controller 102 is also coupled to driver controls 110 and to drive motor 104.

The conventional steering mechanism may provide steering capability for vehicle 100. An operator of the vehicle 100 may also use driver controls 110 (e.g., an accelerator pedal) to control various functions and/or modes or operation of the vehicle 100.

Motor controller 102 may comprise a programmable computing device such as a central processing unit (CPU), application-specific integrated circuit (ASIC), programmable logic controller (PLC), field-programmable gate array (FPGA), digital signal processor (DSP), system on a chip (SoC), or another type of computing device. Motor controller 102 may also comprise power electronics that may be used to power the drive motor 104. Alternatively, the power electronics may be provided in a separate power controller as is known in the art. Motor controller 102 may generally be configured to control the operation of various components coupled to motor controller 102 such as, for example, the CAN devices, battery pack 106 (via BMS 108), and drive motor 104.

In vehicle 100, drive motor 104 may comprise a three-phase AC induction motor, a three-phase surface permanent magnet motor, or a three-phase internal permanent magnet motor, among other possibilities. Drive motor 104 may be drivingly connected via a fixed gear reduction to a conventional two-speed axle and a differential unit. The two-speed gear and differential may preferably comprise a driver-selectable high gear ratio and a driver-selectable low gear ratio. The fixed gear reduction may comprise a fixed ratio belt reduction. The output shafts of the differential are preferably connected via a fixed ratio chain drive to the rear drive wheels of the electric vehicle. It will also be appreciated that the two-speed gear and differential may also comprise a multiplicity of driver-selectable gear ratios.

Vehicle 100 may be powered by an energy storage system with sufficient energy and power capacity to propel the vehicle 100. In a preferred embodiment, the energy storage system may be a battery pack 106 including a number of lithium ion battery modules arranged in series and parallel that may provide a suitable voltage for effective operation of motor controller 102 and drive motor 104.

According to various examples, motor controller 102 may control the operation of vehicle 100 and more particularly drive motor 104 in response to receiving control signals, inputs, etc. (e.g. from driver controls 110, drive motor 102, BMS 108, and/or various other components of vehicle 100).

According to an implementation, motor controller 102 may control the rotational speed and/or torque of drive motor 104 by applying power from battery pack 106 to drive motor 104. In response to receiving the applied power, drive motor 104 may, in turn, apply force in the form of torque to a selected gear, which causes the axle connected to the selected gear and a chain drive to rotate, which causes the rear wheels of vehicle 100 to rotate.

More particularly, to apply power from battery pack 106 to drive motor 104, motor controller 102 may receive, via the CANbus from BMS 108, an indication of the maximum amount of direct discharge current that battery pack 106 may provide, which may be referred to as a "maximum discharge current." Based on the maximum discharge current, motor controller 102 may initiate a flow of discharge current from battery pack 106 subject to the maximum discharge current. In response to receiving the discharge current from battery pack 106, motor controller 102 may convert the discharge current to a 3-phase RMS drive current. Finally, motor controller 102 may supply the 3-phase RMS drive current to drive motor 104 to cause drive motor 104 to generate torque.

As mentioned above, motor controller 102 may generally control the operation of various components of vehicle 100 via driver controls 110. These may include, as illustrated in FIG. 1, an accelerator pedal 111. Driver controls 110 may also include a throttle potentiometer wiper operative to indicate the position of the accelerator pedal 111, which may provide information to the motor controller 102 regarding the amount of driving torque desired by the vehicle operator to propel the vehicle 100.

Figure 2:
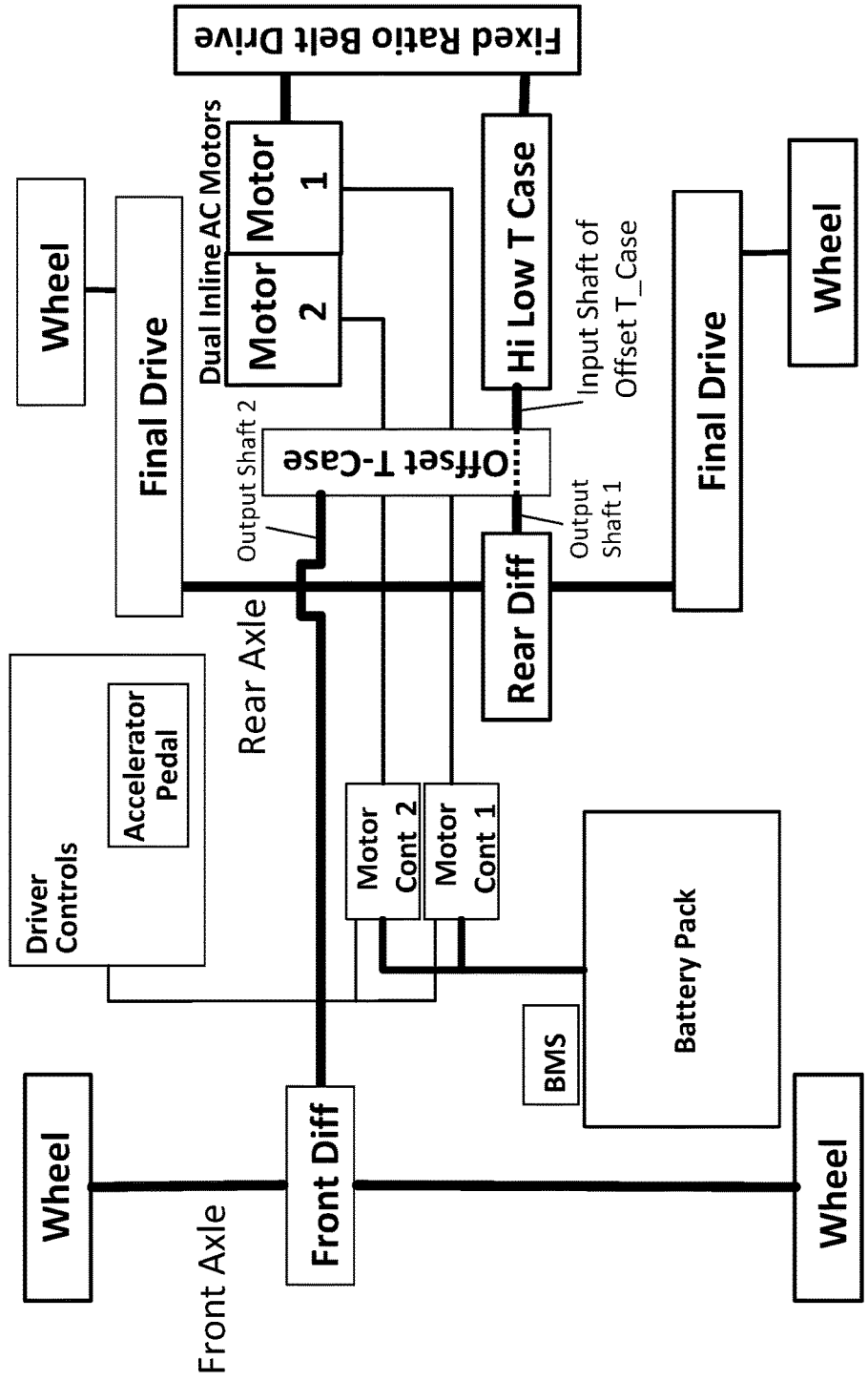
FIG. 2 is a conceptual diagram of a dual-axle drive electric vehicle having two drive motors.

FIG. 2 illustrates a conceptual diagram of a vehicle 200 according to another example implementation. Vehicle 200 may be generally similar to vehicle 100 in that vehicle 200 may be an electrical vehicle. However, vehicle 200 may differ from vehicle 100 due to inclusion of two drive motors rather than the single drive motor 104 of vehicle 100. Vehicle 200 may further differ from vehicle 100 of FIG. 1 in that the dual motors of vehicle 200 drive not only the rear axle as illustrated in FIG. 1, but both a front axle and a rear axle.

Further, vehicle 200 may include two motor controllers and two drive motors. These dual motor controllers of FIG. 2 may generally be configured to control the operation of various components of the vehicle 200. Each motor controller of the dual motor controllers may be configured in a manner similar to motor controller 102, but each motor controller may control a respective drive motor, denoted as motor 1 and motor 2 in FIG. 2.

In vehicle 200, motor 1 and motor 2 may be arranged in-line and drivingly connected via a fixed ratio belt drive to a high low transfer case. The high low transfer case preferably comprises a driver-selected high gear ratio and driver-selected low gear ratio. The dual in-line motors, motor 1 and motor 2, may be identical in mechanical and electrical properties and may be drivingly connected to rotate around a common shaft.

The high-low transfer case may be drivingly connected to an input shaft of an offset transfer case. The offset transfer case is operable to rotate output shaft 1 and output shaft 2 of the offset transfer case to thereby divide the mechanical power coming to or from drive motor 1 and drive motor 2. Output shaft 1, in turn, is drivingly-connected to a rear axle via a rear differential, which is connected to the final drives and wheels on the rear axle. Similarly, output shaft 2 is drivingly connected to the front axle via the front differential, which is connected to the wheels on the front axle. The rear differential and the front differential may be equipped with conventional lock-up differential clutches as is done in conventional four-wheel drive vehicles.

Figure 3:
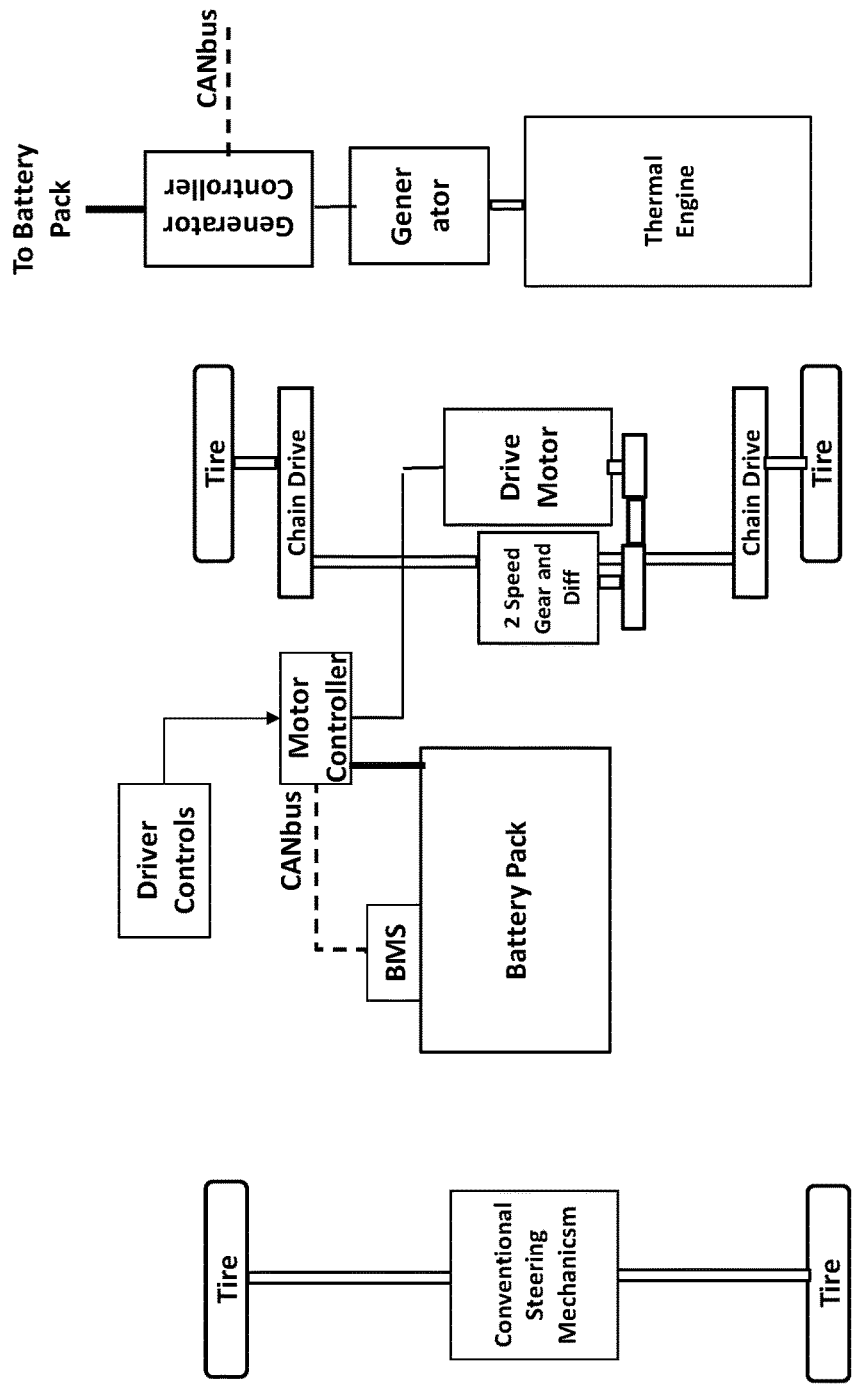
FIG. 3 is a conceptual diagram of a single-axle drive hybrid electric vehicle configuration having a single drive motor.

FIG. 3 illustrates a conceptual diagram of a vehicle 300 according to another example implementation. Vehicle 300 may be generally similar to vehicle 100 in that vehicle 300 may be a single axle-drive vehicle that includes a single motor controller. However, vehicle 300 may differ from vehicle 100 in that vehicle 300 is a hybrid electric vehicle that includes a thermal engine, a generator, and a generator controller that together operate as a Range Extender. For example, the range of the vehicle 300 might not be limited by the energy stored in the battery pack, as the range may be extended by the energy stored in the fuel tank of the thermal engine. It will be apparent that the vehicle 300 is nonetheless propelled only by the torque provided by the drive motor, and that the techniques for controlling current and voltage as described with respect to the vehicle 100, which may provide increased torque and extended range, are fully operable with respect to the vehicle 300 shown in FIG. 3. It will also be apparent that the Range Extender described with reference to FIG. 3 may also be operable in connection with the dual axle drive electric vehicle 200 of FIG. 2.

III. Drive Current and Voltage Control

A. Small Battery Pack Configurations

According to various implementations, the techniques discussed herein may be applicable to various vehicle configurations such as, for example, vehicles 100, 200, and 300. As discussed above, such fully electric and hybrid-electric ("hybrid") vehicles may include a battery pack that provides a direct discharge current that a motor controller converts to an RMS drive current, which the motor controller then supplies to a drive motor, producing a torque that is transferred to the wheels of the vehicle to propel the vehicle.

As noted above, embodiments discussed herein provide several advantages. First, a motor controller may be configured to operate in conjunction with battery packs of relatively small capacity while still allowing the drive motor to output a relatively high tractive effort at low speeds. Second, according to some implementations, a drive motor may output a relatively moderate tractive effort at relatively high speeds, which may result in range extension of the vehicle at higher speed. Third, some embodiments discussed herein provide for a motor controller to transition between providing high and moderate tractive effort when the vehicle is transitioning between low speeds and high speeds. At a high level, motor controller 102 may be configured to limit and control the conversion of direct discharge current from the battery pack to an RMS drive current to achieve the aforementioned advantages. The implementations discussed herein may provide other advantages as well.

Figure 4:
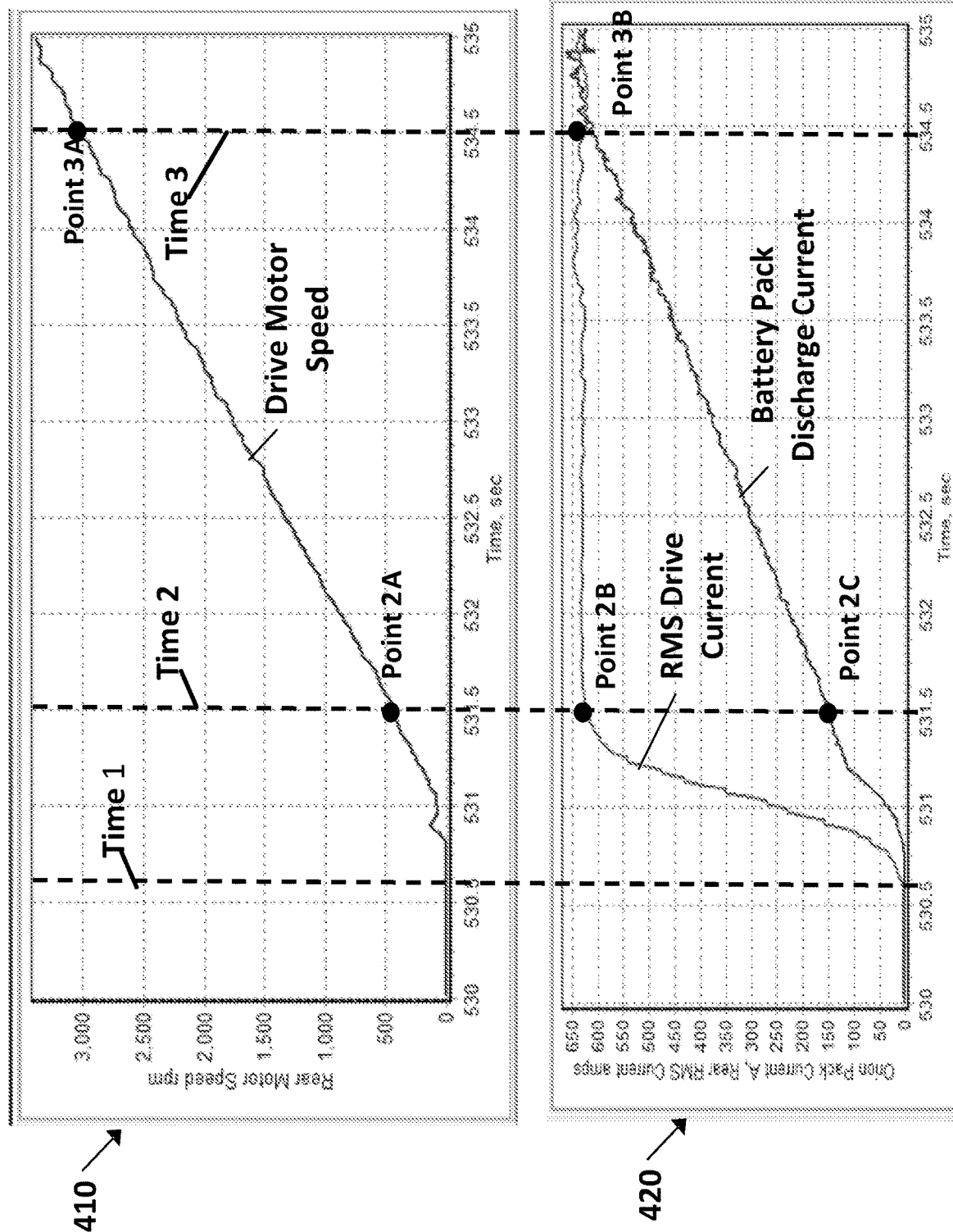
FIG. 4 illustrates a first graph and a second graph of a vehicle acceleration event.

For the purpose of illustrating some of these advantages, FIG. 4 illustrates a first graph 410 and a second graph 420 of a vehicle acceleration event, wherein the vehicle does not utilize the drive current limiting control implementations discussed herein. In the first graph 410, time is plotted on the x-axis, and the rotational speed of the drive motor in RPM is plotted on the y-axis. In second graph 420, time is likewise plotted on the x-axis, and the RMS drive current as well as the battery pack discharge current, which are both measured in amperes, are plotted on the y-axis. The first graph 410 further illustrates the drive motor speed at three times, referred to as Time 1, Time 2, and Time 3. Likewise, the second graph 420 illustrates the RMS drive current and battery pack discharge current at the same three times, Time 1, Time 2, and Time 3.

At Time 1, the drive motor speed is zero. Shortly after Time 1, the vehicle operator depresses the accelerator pedal 111, which causes motor controller 102 to generate an RMS drive current which, in turn, causes drive motor 104 to generate a driving torque thereby causing the vehicle to accelerate. After a short delay, the torque applied by drive motor 104 is sufficiently high to cause the vehicle to begin accelerating in the example illustrated in FIG. 4.

After Time 1, the RMS drive current builds up rapidly until Time 2, at which point drive motor 104 reaches approximately 500 rpm at Point 2A shown in graph 410. Also at Time 2, the RMS drive current reaches approximately 630 amps (indicated at Point 2B in graph 420), which is almost 100% of the maximum RMS drive current that controller 102 can supply, which in the example of FIG. 4 is 650 amps. At Time 2, the direct battery discharge current has reached approximately about 150 amps (as indicated by Point 2C).

As will be understood by one normally skilled in the art, drive motor 104 may be controlled by varying the frequency and voltage applied to the drive motor, for example, using PWM (Pulse Width Modulation) until the Base Speed of drive motor 104 (about 3000 rpm according to the example illustrated in FIG. 4) is reached. For example, at the drive motor rotational speed of 500 rpm shown at Time 2, the battery pack DC power may be proportional to 150 amps times the battery pack voltage of 100 volts. However, the phase voltage applied to drive motor 102 is only about 18 volts, and the resulting AC power delivered to the drive motor 104 is proportional to 650 amps times the phase voltage of 18 volts. As can be seen from this example, it is possible for the drive motor 104 to deliver relatively high torque at low to moderate vehicle speeds, while consuming a relatively low amount of battery power.

Moving onward from Time 2 towards Time 3, the rotational speed of drive motor 104 (and the corresponding vehicle speed) continues to increase more or less linearly as a result of the substantially constant driving torque.

Next, at Time 3, the rotational speed of drive motor 104 reaches about 3000 rpm (Point 3A). At this drive motor speed, drive motor 104 'sees' the full battery voltage and further acceleration of the vehicle is accomplished by field weakening. At Time 3 shown in FIG. 4, the direct battery discharge current supplied from battery pack 106 reaches more than 600 A. In the example of FIG. 4, a relatively large battery pack would be required to provide such a high current. In some cases, even if the battery pack is relatively large, such a high battery discharge current may be in excess of what the battery pack can safely supply. For this reason, it may be desirable to limit the RMS drive current and the drive torque of the vehicle at higher drive motor speeds, which may correspondingly limit the discharge current from the battery pack 106, even in a situation where the vehicle operator requests maximum torque by fully depressing the accelerator pedal 111.

Figure 5:
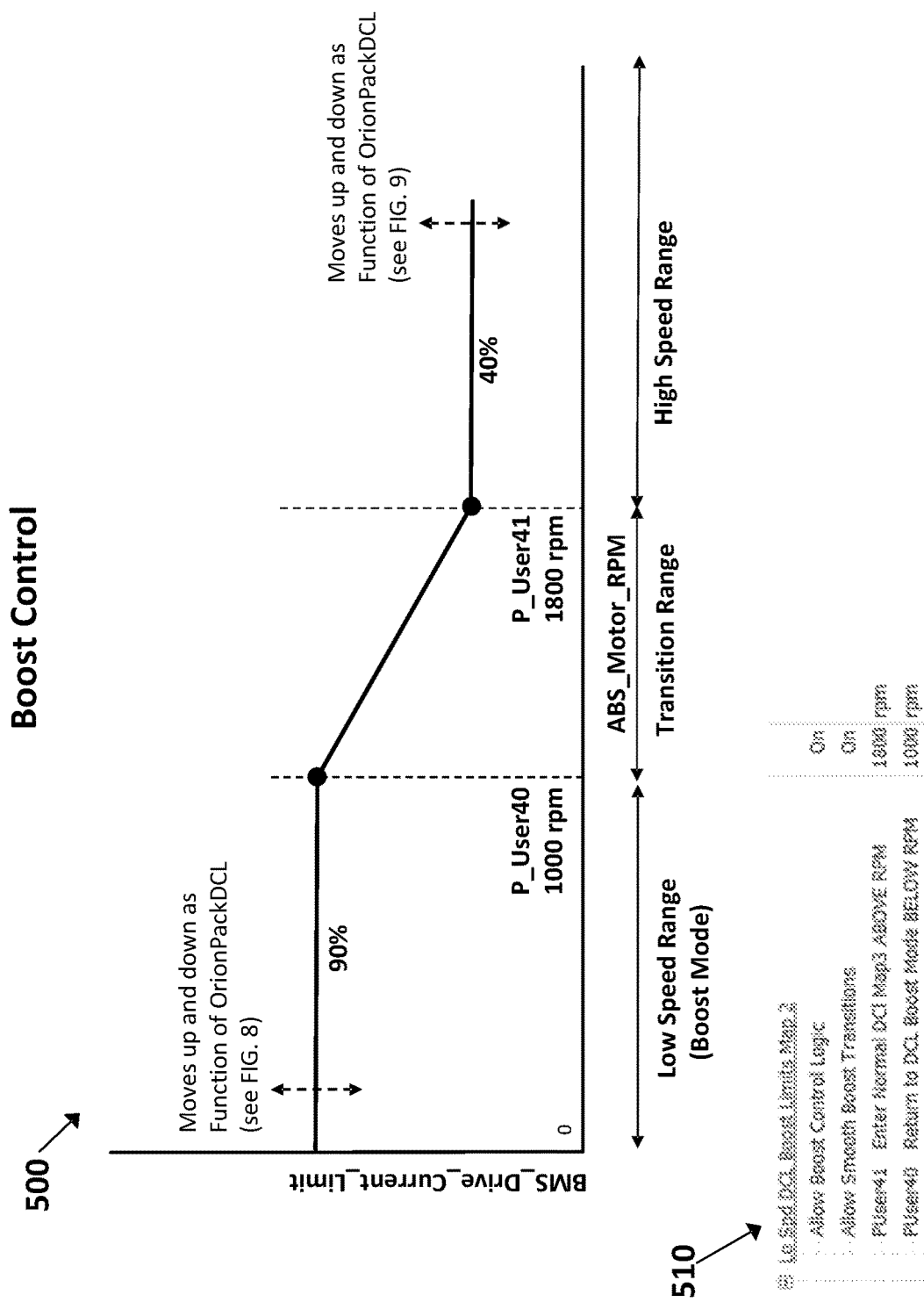
FIG. 5 illustrates a graph of a relationship between a drive motor speed and an RMS drive current limit according to an example implementation, as well as a set of input values for the graph.

Such an implementation is shown, by way of example, in FIG. 5, which may illustrate the behavior of an example motor controller, such as the motor controller 102 shown in FIG. 1. According to some examples, the motor controller 102 may execute code that takes the form of Curtis Vehicle Control Language (VCL) code that controls the various components of vehicle 100. The code may, for instance, allow motor controller 102 to control the process of converting the direct discharge current obtained from battery pack 106 into RMS drive current.

FIG. 5 is a graph 500 that illustrates a relationship between the speed of a drive motor (represented by the VCL variable "ABS_Motor_RPM") and an RMS drive current limit (represented by the VCL variable "BMS_Drive_Current_Limit"). The drive motor may be, for example, the drive motor 104 shown in FIG. 1. Graph 500 includes two curves that are each associated with a respective range of drive motor rotational speeds, namely, a low-speed range and a high-speed range. Graph 500 also includes a transition range between the two curves that is associated with a range of speeds that is between the low-speed and the high-speed ranges.

At a high level, FIG. 5 is a graph 500 that motor controller 102 may be configured to define and/or store, as well as a set of values input 510 that can be used by the motor controller 102 to define the set of curves. Each curve defines a set of relationships between a maximum discharge current and a corresponding RMS drive current limit that sets the maximum amount of RMS drive current that the motor controller may supply to the drive motor when that curve is selected. Each curve may be valid for a set of operating conditions that the motor controller obtains from various components of the vehicle. These operating conditions may take various forms.

As illustrated in the example of FIG. 5, the operating conditions that the motor controller uses to define and select a given curve from the set of curves may include, for instance, the rotational speed of drive motor 102 (e.g., measured in rpm), and/or a maximum discharge current of battery pack 106 at a given time. The operating conditions may take various other forms as well.

Based on the selected curve, motor controller 102 may map an operating condition, such as a maximum discharge current that the battery pack 106 is capable of supplying at a given time, to an RMS drive current limit value that is defined by the selected curve. In general, the RMS drive current limit specified by the selected curve may be directly correlated with the maximum direct discharge current that battery pack 106 is capable of supplying at a given time.

The maximum discharge current that battery pack 106 can safely supply may change over time. The battery management system (BMS) 108, which may be a component of the battery pack 106 that manages and ensures safety of the operation of the battery pack 106, may periodically report a value that indicates the maximum discharge current to motor controller 102.

In some instances, the rotational velocity of the drive motor 104 may not be within any of the ranges associated with any of the curves that form the set of curves. In such instances, the motor controller 102 may use the endpoints of the two closest curves to determine the RMS drive current limit. For instance, if the rotational speed of the drive motor 104 falls between an endpoint of a low speed curve and the starting point of a high-speed curve, the motor controller 102 may determine the RMS drive current limit by interpolating between the endpoint of the low-speed curve and the starting point of the high-speed curve based on the motor speed of the drive motor 104.

After determining an RMS drive current limit, motor controller 102 may then limit the RMS drive current that motor controller 102 converts from the direct discharge current supplied by the battery pack 106, and then apply the limited RMS drive current to drive motor 104. The functions of obtaining the direct discharge current from the battery pack 106 and converting the direct discharge current to an RMS drive current subject a determined RMS drive current limit may take various forms.

Graph 500 includes a low speed curve (labelled "Low-Speed Range") and a high-speed curve (labelled "High-Speed Range") as well as a transition range (labelled "Transition Range") that falls between the low-speed curve and the high-speed curve. The high-speed curve and the low-speed curve can be associated with, and valid for different ranges of rotational speeds of drive motor 104. As an example, a first curve, such as the low-speed curve represented in FIG. 5, may be valid for a first speed range, such as a low-speed range. A second curve, such as the high-speed curve represented in FIG. 5, may be valid for a second, different speed range of the drive motor 104, such as a high-speed range. While two curves have been described for the purpose of example, it should be understood that the set of curves may include three or more curves as well.

To select and utilize the RMS drive current limits defined by the various speed range curves, the motor controller 102 selects a given curve from the set of curves based on the rotational speed of the drive motor 104. Based on the selected curve, the motor controller 102 determines an RMS drive current limit for motor controller 102.

According to the example of FIG. 5, motor controller 102 may be configured to select the low-speed curve for a drive motor rotational speed range between 0 and 1000 rpm, the high-speed range for a drive motor rotational speed range above 1800 rpm, and the transition range for a drive motor rotational speed range between 1000 and 1800 rpm.

Based on the rotational speed of drive motor 104, and the maximum discharge current that may be supplied by the battery pack 106, motor controller 102 sets the RMS drive current limit. The RMS drive current limit in turn limits the maximum RMS drive current that motor controller 102 may generate when converting direct discharge current from battery pack 106 to an RMS current, and thereby also limits the power draw from battery pack 106.

According to some examples of this disclosure, motor controller 102 may be configured to limit the RMS drive current by setting a VCL variable, such as the variable BMS_Drive_Current_Limit, to a particular value. Setting BMS_Drive_Current_Limit to a particular value may cause motor controller 102 to limit the RMS drive current limit. In some implementations, the drive current limit may be represented as a percentage of the maximum possible RMS drive current that motor controller 102 may produce, as described above. Motor controller 102 may be configured to programmatically control the production of RMS drive current in various other manners as well.

Graph 500 includes a low-speed range, a high-speed range, and a transition range. If the rotational speed of the drive motor 104 falls into the low-speed range, motor controller 102 may set the BMS_Drive_Current_Limit variable to 90%, which causes motor controller 102 to set the RMS drive current limit to 90% of the maximum amount of RMS drive current that motor controller 102 is capable of producing. In the low-speed range, motor controller 102 provides a relatively low phase voltage to drive motor 104, as described above with reference FIG. 4. Advantageously, while drive motor 104 operates in the low-speed range, motor controller 102 can cause drive motor 104 to develop a substantial amount of the maximum possible torque (as indicated by Point 2B in graph 420) while expending a relatively small amount of battery discharge current (Point 2C in graph 420). Consequently, while motor controller 102 and drive motor 104 operate in the low-speed range, the motor controller 102 may set BMS_Drive_Current_Limit to a high percentage value without danger of exceeding any current limits of, or overburdening, the battery pack 106.

The above examples describe the operation of a vehicle in the low-speed range in the forward direction. However, it should be understood that the low-speed range and other rotational speed ranges may apply to the operation of the vehicle in the reverse direction as well.

As another example, if the rotational speed of drive motor 104 falls into the high-speed range, motor controller 102 may set the BMS_Drive_Current_Limit variable to 40%, which causes motor controller 102 to set the RMS drive current limit to 40% of maximum RMS drive current of motor controller 102, as shown in FIG. 5.

In the high-speed range, the phase voltage applied by the motor controller 102 may have increased to a point where the battery discharge current reaches substantial values, as shown at Point 3B in graph 420. In such a situation, a relatively high battery discharge current may exceed what battery pack 106 can safely supply. By limiting the RMS drive current to 40% of the maximum-rated drive current value of the motor controller 102, the discharge current required from battery pack 106 may be reduced to a value that the battery pack 106 can safely provide, even if the vehicle operator requests maximum torque by fully depressing the accelerator pedal 111.

While the curves in FIG. 5 for the low-speed range and the high-speed range are illustrated as being set to fixed percentages (90% and 40%), it should be understood that the RMS drive current limits in the low-speed and high-speed ranges may vary based on the charge level of battery pack 106 (which may be represented with the VCL variable OrionPackDCL, in amps) and also based on the rotational speed of drive motor 104. For example, the RMS drive current limit may vary within the low and high-speed ranges, as discussed in more detail below with respect to FIGS. 6 and 7, respectively.

Further, if the rotational speed of drive motor 104 is slightly above 1000 rpm, the value assigned to BMS_Drive_Current_Limit, and the corresponding RMS drive current limit, may be slightly below 90%. Similarly, as the motor speed approaches 1800 rpm, the value assigned to BMS_Drive_Current_Limit may be slightly higher than 40%. The result is a smooth transition of torque applied by the drive motor 104 in the transition range between the low-speed range and the high-speed range. The motor controller 102 may be configured to control the RMS drive current limit in various other manners as well.

The motor controller 102 may use the transition range between the low-speed and high-speed curves of graph 500 to define the RMS drive current limit for rotational speeds of drive motor 104 between an endpoint of the low-speed range, (e.g., 1000 rpm in the example of FIG. 5), and a starting point of the high-speed range, (e.g., 1800 rpm in the example of FIG. 5). To determine the RMS drive current limit for speeds within the transition range, motor controller 102 may be configured to interpolate (e.g., linearly interpolate) values for BMS_Drive_Current_Limit between (1) the endpoint of the low-speed range, and (2) the starting point of the high-speed range. As an example, if the rotational speed of drive motor 104 is 1600 rpm, the linear interpolation between the low-speed range endpoint and the high-speed range starting point (0.90 and 0.40, respectively) is equal to 0.775. This would correspond to an RMS drive current limit of 77.5% of the maximum RMS current.

Referring again to FIG. 5, a set of input values 510 illustrates variables that are stored in non-volatile memory of motor controller 102, and may be used to establish the graph 500. More particularly, the set of input values 510 illustrates the storage in non-volatile memory of motor controller 102 of various VCL variables that, when set as part of a larger VCL program, may define the rotational speeds associated with the low-speed range, the high-speed range, and the transition range. For example, the set of input values 510 includes a first variable, P_User40, which is set to 1000 rpm and defines the endpoint of the low-speed range. A second variable, P_User41, is set to 1800 rpm and defines the starting point of the high-speed range.

Now that the operation of motor controller 102 with respect to a low and high-speed range has been described at a high level, additional details regarding the operation motor controller 102 while in the low-speed range and high-speed range will be discussed with respect to FIGS. 6 and 7, respectively.

Figure 6:
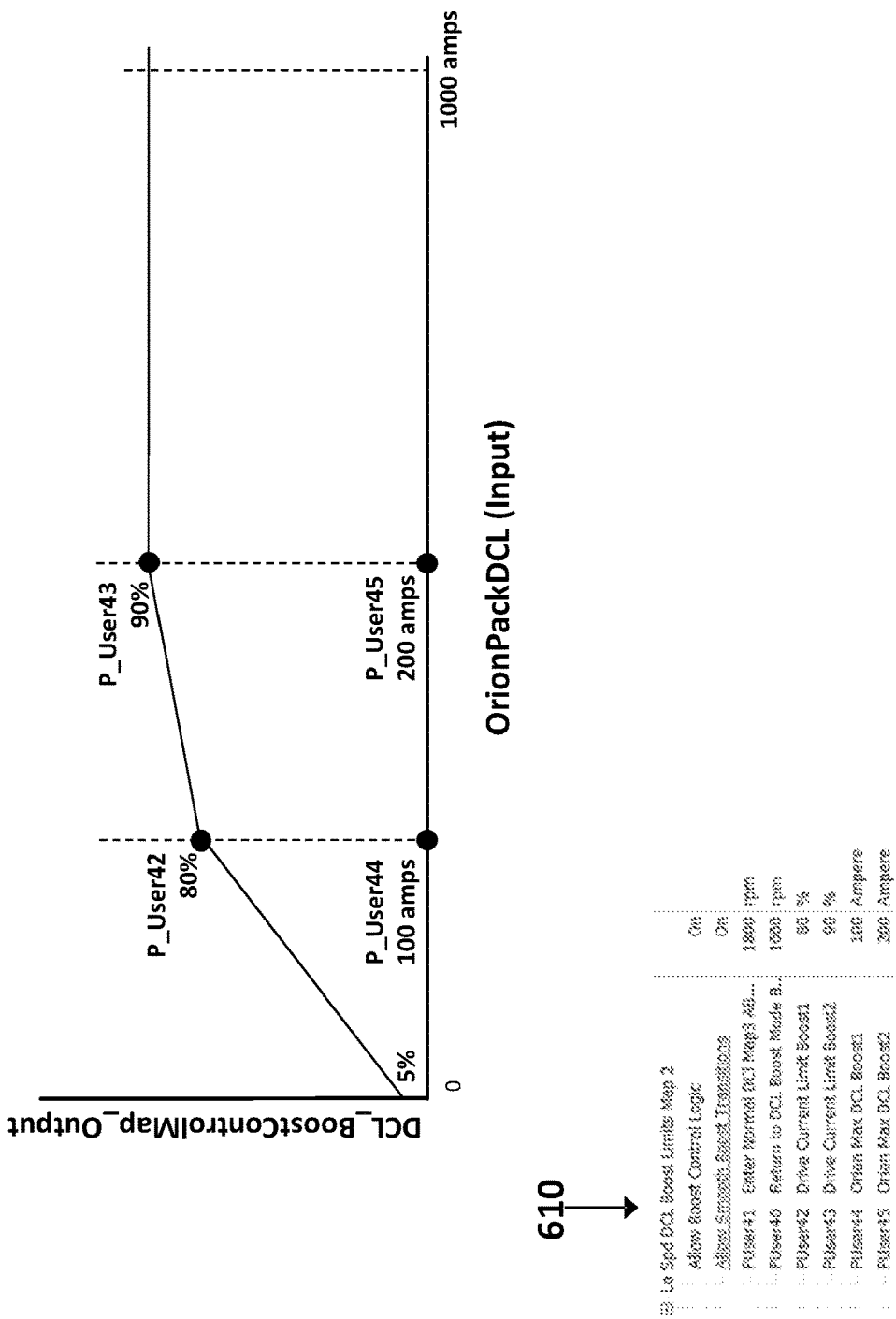
FIG. 6 illustrates a curve showing a relationship between a maximum battery discharge current and a drive current limit according to an example implementation, as well as a set of input values for the graph.

FIG. 6 illustrates a graph 600 of a curve associated with a low-speed range and a set of input values 610 that may be used to define the graph 600. For example, graph 600 may be associated with the low-speed range of graph 500, which motor controller 102 may select in response to the rotational speed of drive motor 104 being within the range of 0-1000 rpm, as discussed above.

The curve illustrated in graph 600 of FIG. 6 illustrates the relationship between maximum discharge current of battery pack 106 (represented by the variable OrionPackDCL as reported by BMS 108) and RMS drive current limits. Accordingly, the motor controller 102 may use a VCL function to define graph 600, also referred to herein as a low-speed map or a low-speed curve, that can be used to determine the correspondence between a given input—a maximum discharge level of battery pack 106, in amps—and a corresponding RMS drive current limit, also in amps.

Once the graph 600 is defined, the motor controller 102 takes the maximum discharge current of battery pack 106 (i.e., OrionPackDCL in amps) as input and uses the defined low-speed map to determine an output. The output takes the form of a VCL map output variable (DCL_BoostControlMap_Output), which may be a percentage value that is then used to set the RMS drive current limit, as noted above. This limits the amount of RMS drive current requested by the drive motor 102 and thus the amount of discharge current provided by battery pack 106.

Graph 600 is defined by a set of points, which in the example of FIG. 6 are represented by the VCL variables P_User42 (equal to 80% of the maximum RMS drive current), P_User43 (equal to 90% of the maximum RMS drive current), P_User44 (equal to 100 amps), and P_User45 (equal to 200 amps). Each of the aforementioned variables may be set and stored in non-volatile memory in motor controller 102.

Shown below is a code segment which illustrates one example of how the low-speed boost map, (referred to as "DCL_BoostControlMap" in VCL code), may be implemented using the VCL Setup_MAP and Automate_MAP functions.

```
Setup_MAP(DCL_BoostControlMap,4,
         0,      1638,          ;0
    P_User44, P_User42,    ;OrionMaxDCL_Boost1
    P_User45, P_User43,    ;OrionMaxDCL_Boost2
       1000, P_User43,    ;1000
         0,0,
         0,0,
         0,0)
Automate_MAP(DCL_BoostControlMap, @OrionPackDCL)
```

The functions shown above may cause motor controller 102 to initialize and automatically update the low-speed map. For example, the motor controller 102 may execute the above code segment at initialization of start-up, and the code segment may run automatically thereafter. Thus, as the input (OrionPackDCL) changes, the output value of the low-speed map, DCL_BoostControlMap_Output, changes accordingly. This map output variable may be used to set the value for BMS_Drive_Current_Limit, which is then used to establish the RMS drive current limit.

The code segment above, in conjunction with the aforementioned variables and other possible inputs, may cause motor controller 102 to define the curve illustrated in graph 600. For instance, the curve illustrated in graph 600 has a 5% RMS drive current limit at 0 amps maximum discharge current from the battery pack 106. This starting point may be established by a separate VCL variable. The curve then increases linearly to an RMS drive current limit of 80% at 100 amps. From 100 amps to 200 amps, the RMS drive current limit increases linearly from 80% to 90%. Finally, from 200 amps to 1000 amps of maximum direct battery discharge current, the RMS drive current limit stays constant at 90%.

As one example implementation, if the battery pack charge level (i.e., the maximum discharge current of the battery pack 106) represented by the input variable OrionPackDCL is 200 amps, the low-speed map shown in FIG. 6 will result in a value of 90% ultimately being assigned to BMS_Drive_Current_Limit (via the map output variable DCL_BoostControlMap_Output). This will cause drive motor 104 to produce a high RMS drive current and a correspondingly high driving torque. If the charge of the battery pack 106 decreases, the value of OrionPackDCL may fall to 100 amps, in which case the low-speed range map output value will decrease to 80%, thereby decreasing the discharge current from the battery pack 106 somewhat. At the low rotational speeds of drive motor 104 that are associated with the low-speed range, the discharge current drawn from the battery pack 106 may be relatively low, even at relatively high values of motor torque, as shown at Point 2C of FIG. 4. As discussed above, this may correspond to a relatively low forward-speed of the vehicle that nonetheless requires a relatively high tractive effort, due to the terrain or other possible considerations.

Figure 7:
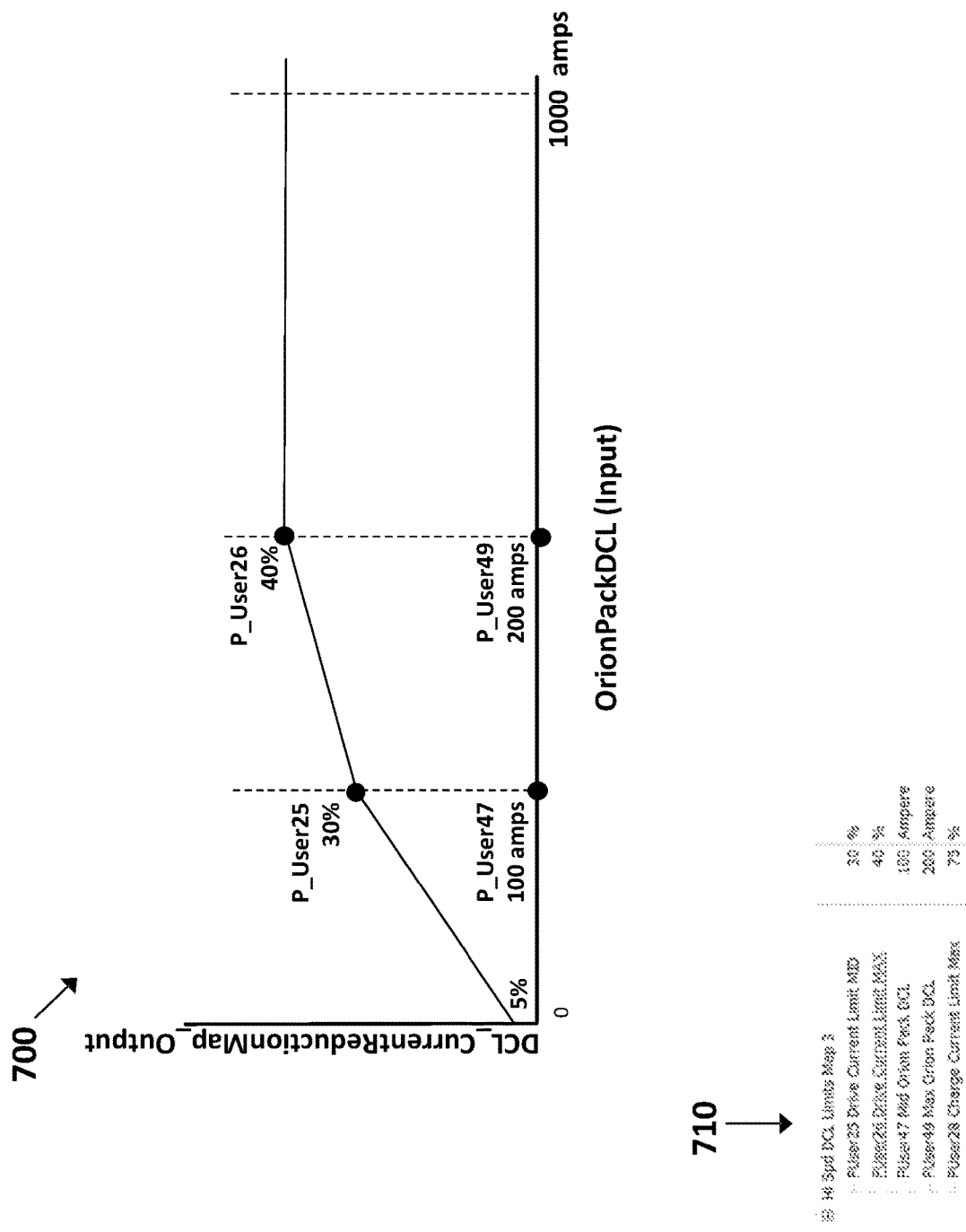
FIG. 7 illustrates a curve showing a relationship between a maximum battery discharge current and a drive current limit according to another example implementation, as well as a set of input values for the graph.

FIG. 7 illustrates a graph 700 of a curve associated with a high-speed range and a set of input values 710 that may be used to define the graph 700. For example, graph 700 may be associated with the high-speed range of graph 500, which motor controller 102 may select in response to the rotational speed of drive motor 104 being above 1800 rpm, as seen in FIG. 5.

As discussed above with respect to the curve shown in FIG. 6, the curve illustrated in graph 700 of FIG. 7 illustrates the relationship between maximum discharge levels of battery pack 106 (represented by the variable OrionPackDCL as reported by BMS 108) and RMS drive current limits. Accordingly, the motor controller 102 may use a VCL function to define graph 700, also referred to herein as a high-speed map or a high-speed curve, that can be used to determine the correspondence between a given input—a maximum discharge level of battery pack 106—and a corresponding RMS drive current limit.

Once the graph 700 is defined, the motor controller 102 takes the maximum discharge current of battery pack 106 (i.e., OrionPackDCL in amps) as input and uses the defined high-speed map to determine an output. The output takes the form of a VCL map output variable (DCL_CurrentReductionMap_Output), which may be a percentage value that is then used to set the RMS drive current limit, as noted above. This limits the amount of RMS drive current requested by the drive motor 102 and thus the amount of discharge current provided by battery pack 106.

Graph 700 is defined by a set of points, which in the example of FIG. 7 are represented by the VCL variables P_User25 (equal to 30% of BMS_Drive_Current_Limit), P_User26 (equal to 40% of BMS_Drive_Current_Limit), P_User47 (equal to 100 amps), and P_User49 (equal to 200 amps). Each of the aforementioned variables may be set and stored in non-volatile memory of motor controller 102.

Shown below is a code segment which illustrates one example of how the high-speed map, (referred to as "DCL_CurrentReductionMap" in VCL code), may be implemented using the VCL Setup_MAP and Automate_MAP functions.

```
Setup_MAP(DCL_CurrentReductionMap,4,    ;MAP ID = 3
         0,              1638,
    P_User47,        P_User25,
    P_User49,        P_User26,
       1000,         P_User26,
```

```
0,0,
0,0,
0,0)
Automate_MAP(DCL_CurrentReductionMap,   @OrionPackDCL);
```

The functions shown above may cause motor controller 102 to initialize and automatically update the high-speed map. For example, the motor controller 102 may execute the above code segment at initialization of start-up, and the code may run automatically thereafter. Thus, as the input (OrionPackDCL) changes, the output value of the high-speed map, DCL_CurrentReductionMap_Output, changes accordingly. This map output variable may then be set as BMS_Drive_Current_Limit, establishing the RMS drive current limit.

The code segment above, in conjunction with the aforementioned variables and other possible inputs, may cause motor controller 102 to define the curve illustrated in graph 700. For instance, the curve illustrated in graph 700 has a 5% RMS drive current limit at 0 amps maximum discharge current from the battery pack. This starting point may be established by a separate VCL variable. The curve then increases linearly to an RMS drive current limit of 30% at 100 amps. From 100 amps to 200 amps, the RMS drive current limit increases linearly from 30% to 40%. Finally, from 200 amps to 1000 amps of maximum direct battery discharge current, the RMS drive current limit stays constant at 40%.

As an example implementation, if the battery pack charge level (i.e., the maximum discharge current of the battery pack 106) represented by the input variable OrionPackDCL is 200 amps, the high-speed map shown in FIG. 6 will result in a value of 40% ultimately being assigned to BMS_Drive_Current_Limit (via the map output variable DCL_CurrentReductionMap_Output). This will cause drive motor 104 to produce a moderate RMS drive current and a correspondingly moderate driving torque. If the charge of the battery pack 106 decreases, the value of OrionPackDCL may fall to 100 amps, in which case the high-speed map output will decrease to 30%, thereby decreasing the discharge current from the battery pack 106 to a lower value.

By limiting the RMS drive current in this way at the high rotational speeds associated with the high-speed range, the motor controller 102 may limit the discharge current drawn from the battery pack 106. This, in turn, may reduce the possibility that an overly high discharge current will be drawn from the battery pack 106, as discussed above with respect to FIG. 4. Further, limiting the RMS drive current in this way may extend the charge of the battery pack 106 as well by reducing torque and drawing less discharge current.

In some implementations, the mapping functions discussed above that define graphs 600 and 700 may run substantially continuously and simultaneously during operation of the vehicle 100. Furthermore, the mapping functions may run independently of the other operations of the motor controller 102. Accordingly, the motor controller 102 may, based on the maximum battery discharge input received from the BMS 108, determine and store outputs from both the low-speed curve and the high-speed curve multiple times per second (e.g., 200 times per second). In such an example, once the motor controller 102 determines the rotational speed of the drive motor 104 and identifies the corresponding curve, the motor controller 102 may select the corresponding output.

In some other implementations, the mapping functions may run continuously as discussed above, but the motor controller 102 might not determine an output from either curve until after the motor controller 102 determines the rotational velocity of the drive motor 104 at a given time. In this way, the motor controller 102 may determine and store an output from only the curve that corresponds to the rotational velocity of the drive motor 104. Further, in a situation where the rotational velocity of the drive motor 104 is in the transition range, the motor controller 102 might not determine an output from either curve, instead proceeding with an interpolation between their respective endpoints, as discussed above.

In still other implementations, the mapping functions might not run continuously, as discussed above. Rather, the motor controller 102 may, based on the determined rotational velocity of the drive motor 104 at a given time, execute only the mapping function that corresponds to the determined rotational velocity, and then determine the corresponding output accordingly. Further, if the rotational velocity of the drive motor 104 at a given time is within the transition range, the motor controller 102 may execute neither mapping function, instead proceeding with an interpolation between their respective endpoints, which may be described by the input variables discussed above. Numerous other possibilities for the execution frequency of the mapping functions and obtaining outputs therefrom are also possible, including combinations of the possibilities discussed above.

Figure 8:
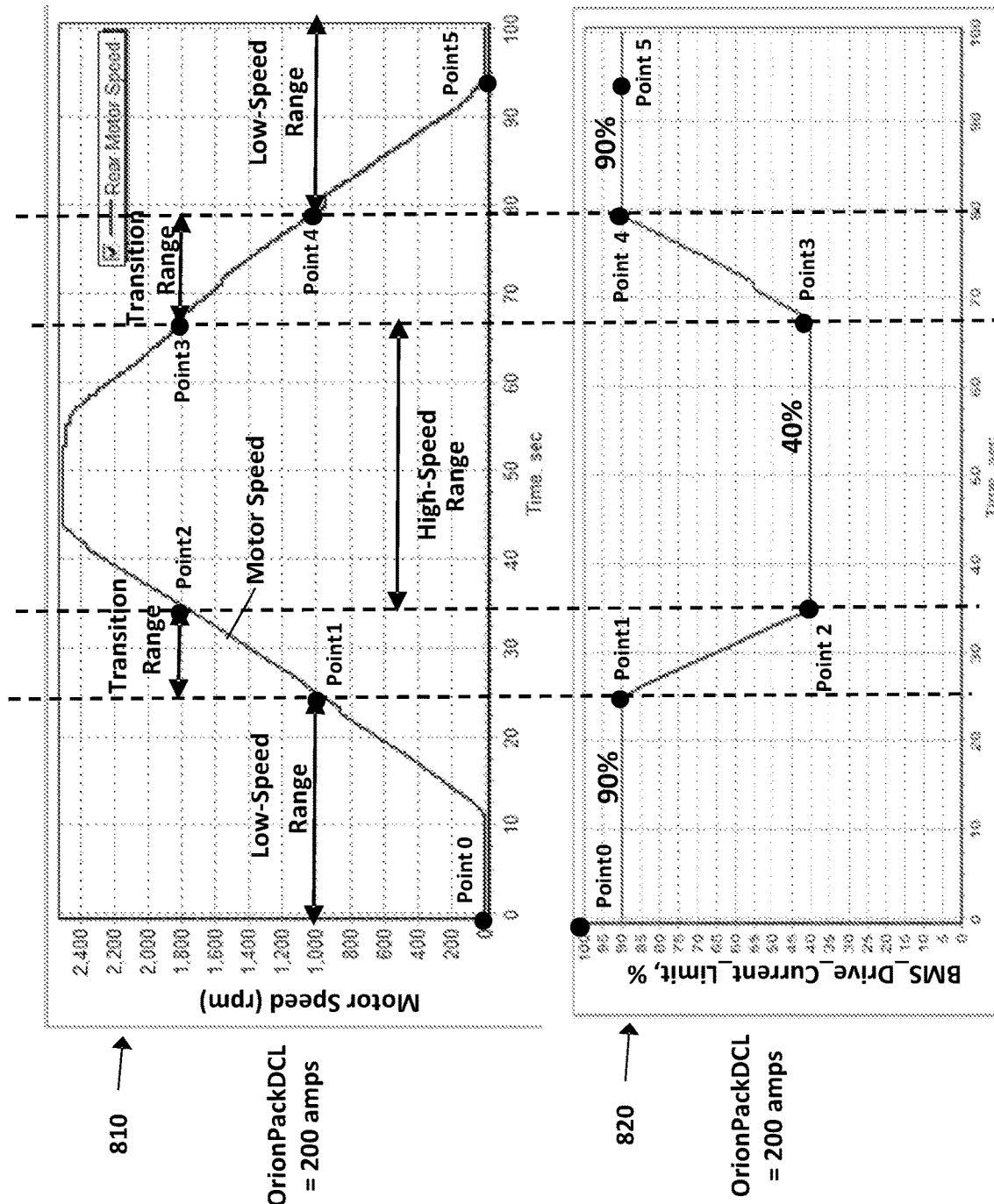
FIG. 8 illustrates a first graph and a second graph of a vehicle acceleration-deceleration event, according to an example implementation.

FIG. 8 shows two graphs of an example acceleration-deceleration event of a vehicle, such as the vehicle 100. In particular, FIG. 8 illustrates how the RMS drive current limit, represented by the VCL variable BMS_Drive_Current_Limit, is updated as the vehicle 100 accelerates and decelerates through different speed ranges. Graph 810 shows the speed of the drive motor 104, and graph 820 shows the resulting value of the BMS_Drive_Current_Limit. Both graphs 810 and 820 are shown as a function of time. During the acceleration-deceleration event of FIG. 8, the value of OrionPackDCL, representing the maximum discharge current of the battery pack 106 in amps, as transmitted over the CANbus from the BMS 108, is constant at a value of 200 amps.

Using the example values shown in FIG. 8, the vehicle 100 is in the low-speed range from Point 0 until the motor speed reaches 1000 rpm at Point 1, as shown in graph 810. In the low-speed range, the BMS_Drive_Current_Limit shown in graph 820 is 90%, which motor controller 102 obtains using the low-speed range map shown in graph 600 of FIG. 6, for the input value of OrionPackDCL equal to 200 amps.

Later, from Point 2 until Point 3, while the motor speed is above 1800 rpm, the vehicle 100 is in the high-speed range. In this range between Point 2 and Point 3, motor controller 102 assigns BMS_Drive_Current_Limit a value of 40%, which motor controller 102 obtains using the high-speed range map shown in graph 700 of FIG. 7, for the input value of OrionPackDCL equal to 200 amps.

In the transition range between Point 1 and Point 2 during acceleration, and again between Point 3 and Point 4 during deceleration, motor controller 102 determines the value of BMS_Drive_Current_Limit by linearly interpolating between the endpoint of the low-speed range map depicted in graph 600 and the high-speed range map of graph 700. Upon deceleration below 1000 rpm, the drive motor 104 returns to the low speed range, and the motor controller 102 assigns BMS_Drive_Current_Limit a value of 90% once again.

As can be seen in FIG. 8, the result of motor controller 102 using the maps discussed above is: (1) the application of high motor torque in the low-speed range, (2) a gradual decrease of motor torque as the motor accelerates through the transition range, (3) a relatively lower motor torque in the high-speed range, and (4) an increase in motor torque as the motor decelerates back to the low-speed range.

Figure 9:
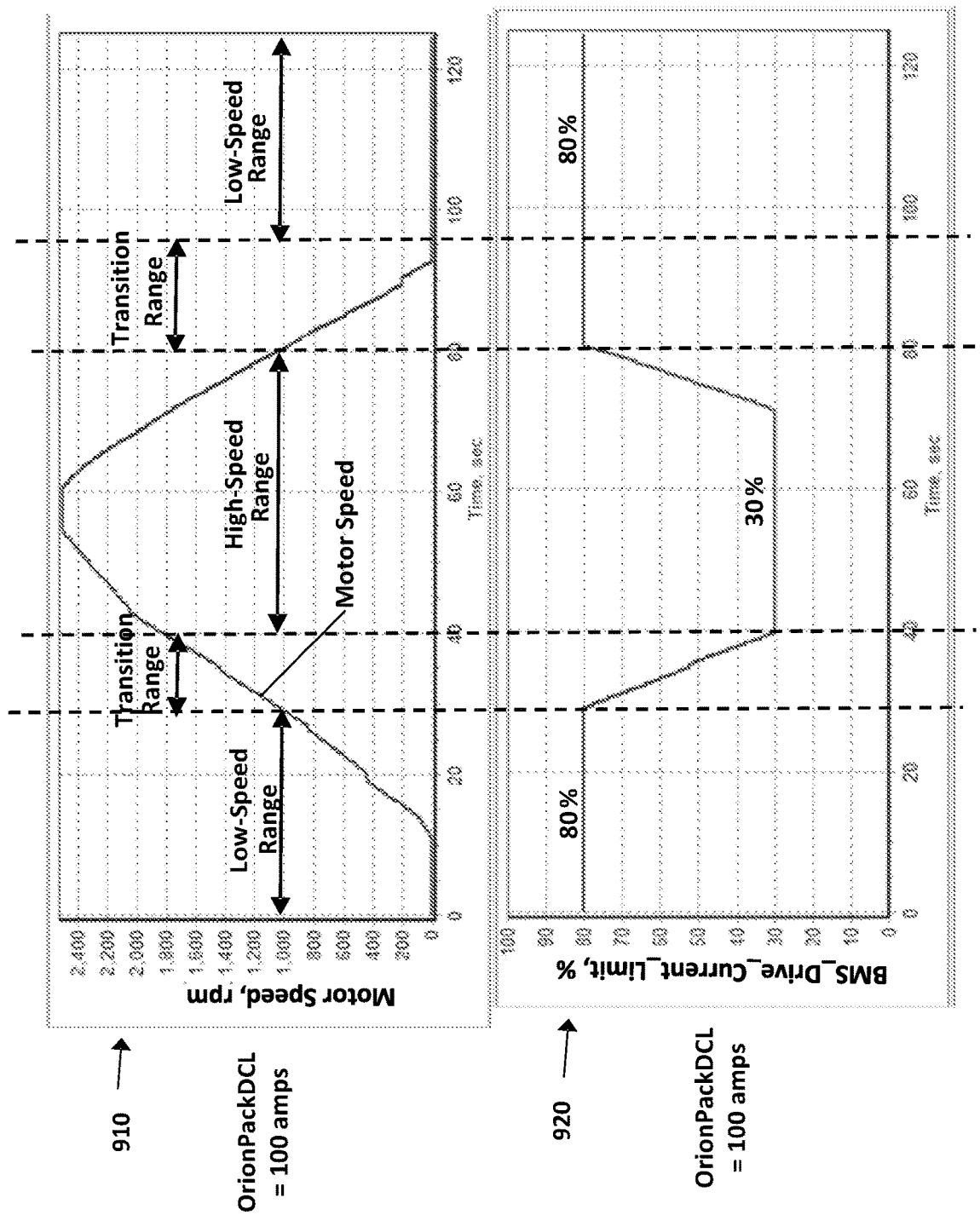
FIG. 9 illustrates a first graph and a second graph of a vehicle acceleration-deceleration event, according to another example implementation.

FIG. 9 illustrates a first graph 910 and a second graph 920 of an acceleration-deceleration event similar to the one depicted in FIG. 8. However, in the acceleration-deceleration event shown in FIG. 9, the battery pack 106 is at a relatively low state of charge, and the maximum discharge current communicated by BMS 108 as the variable Orion-PackDCL is only 100 amps. As may be seen in graph 920, the BMS_Drive_Current_Limit in the low-speed range has been reduced to 80% of the maximum RMS drive current. It should be noted that, even though the BMS_Drive_Current_Limit is 80%, the actual discharge current from the battery pack 106 may be quite low to accommodate the low value of OrionPackDCL. In the high-speed range of graph 920, the BMS_Drive_Current_Limit may be only 30%, which may reduce the possibility that the discharge current of battery pack 106 reaches excessive values.

Figure 10:
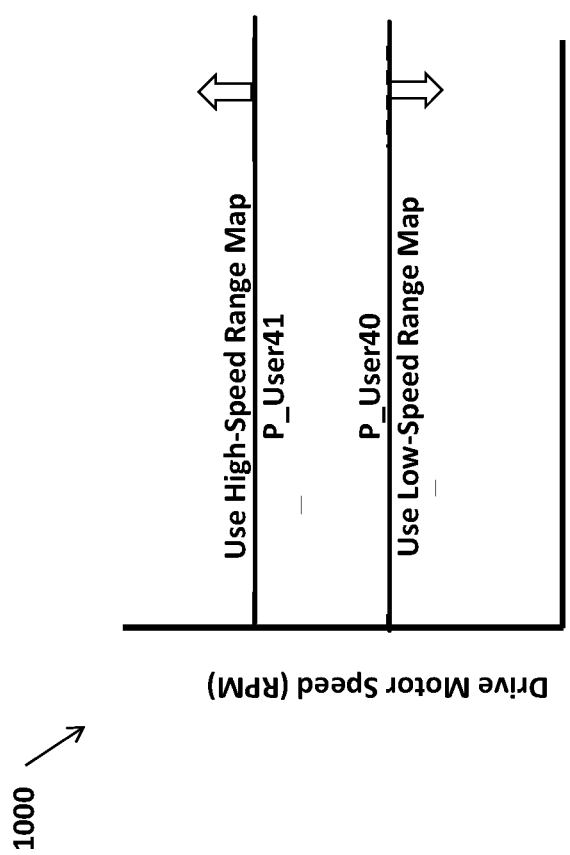
FIG. 10 illustrates a graph associated with selecting a high-speed range curve or a low-speed range curve based on a drive motor speed, according to an example implementation.

FIG. 10 illustrates a graph 1000 showing another example implementation for selecting an RMS drive current limit, according to some embodiments. Graph 1000 shows a division of the possible motor speeds into a low-speed range and a high-speed range. Operation of the motor controller 102 according to the implementation illustrated in graph 1000 may be similar to the techniques illustrated in FIG. 5 and discussed above, except that there is no transition range. For example, the motor controller 102 may be configured to set an RMS drive current limit based on the low-speed range map shown in FIG. 6 at startup. The motor controller 102 may continue using the low-speed range map, including for drive motor speeds that would otherwise be in the transition range of FIG. 5, until the speed of the drive motor 104 increases past the value corresponding to the bottom end of the high-speed range (represented by the VCL variable P_User41). If the speed of the drive motor 104 crosses this threshold, the motor controller 102 sets the value of BMS_Drive_Current_Limit according to the high-speed range map as illustrated in graph 700. The motor controller 102 may then continue using the high-speed range map, including for drive motor speeds that would otherwise be in the transition range of FIG. 5, until the speed of the drive motor 104 falls below the value corresponding to the top end of the low-speed range (represented by the VCL variable P_User40). When the drive motor speed crosses this lower threshold, the motor controller 102 sets the BMS_Drive_Current_Limit using the low-speed map as illustrated in graph 600.

It will be appreciated that when the alternative embodiment depicted in graph 1000 is utilized, operation of the vehicle may be analogous to the operation of a vehicle equipped with a manual multi-speed transmission when there is a change in the transmission gear ratio.

As described above, various vehicle configurations of this disclosure may utilize multiple different gears. According to some implementations, motor controller 102 may be configured to store and select from a different set of curves based on the currently-engaged gear of the vehicle. For example, if the vehicle is engaged in a low gear, the motor controller 102 may be configured to select form a first set of curves, which may comprise a low-speed range curve for the low gear, and a high-speed range gear for the low gear. If the vehicle is engaged in a high gear, motor controller 102 may be configured to select from a second set of curves that may comprise a low-speed range curve for the high gear and a high-speed range curve for the high gear. The different sets of curves that may be associated with different gears may take various other forms as well.

As described herein with respect to FIGS. 5-7, motor controller 102 may be configured to select, based on the rotational speed of the drive motor 104, a curve that defines a relationship between the maximum discharge current of the battery pack 106 and the RMS drive current limit. As described with respect to FIGS. 5-7, the endpoints that define each of the speed ranges that are fixed values. For example, the low-speed range illustrated in FIG. 5 has a range from 0 to 1000 rpm.

However, according to yet another embodiment, the endpoints that define each of the speed ranges may be variable. For example, an endpoint of the low-speed range may vary from 600 to 1000 rpm. Further, the endpoints that define some or all of the speed ranges may vary based on different factors. For instance, the endpoints of a speed range may vary based on the currently-engaged gear of the vehicle, the maximum discharge current of the battery pack 106, or various other factors as well.

B. Large Battery Configurations

The discussion above has involved obtaining relatively high propulsion torque at low vehicle speeds when the battery pack 106 is relatively small. A small battery pack may be defined for the purpose of the examples herein as a battery pack having a capacity such that it cannot supply sufficient drive current to provide full motor torque at all useful vehicle speeds except in short bursts not exceeding a few tens of seconds.

However, the techniques above also provide advantages for a vehicle equipped with a relatively large battery pack. For the purpose of the examples herein, a large battery pack may be defined as a battery pack having a capacity such that it can provide sufficient drive current to allow the motor to operate at substantially full torque output for longer periods of time and at moderate to high vehicle speeds.

Figure 11:
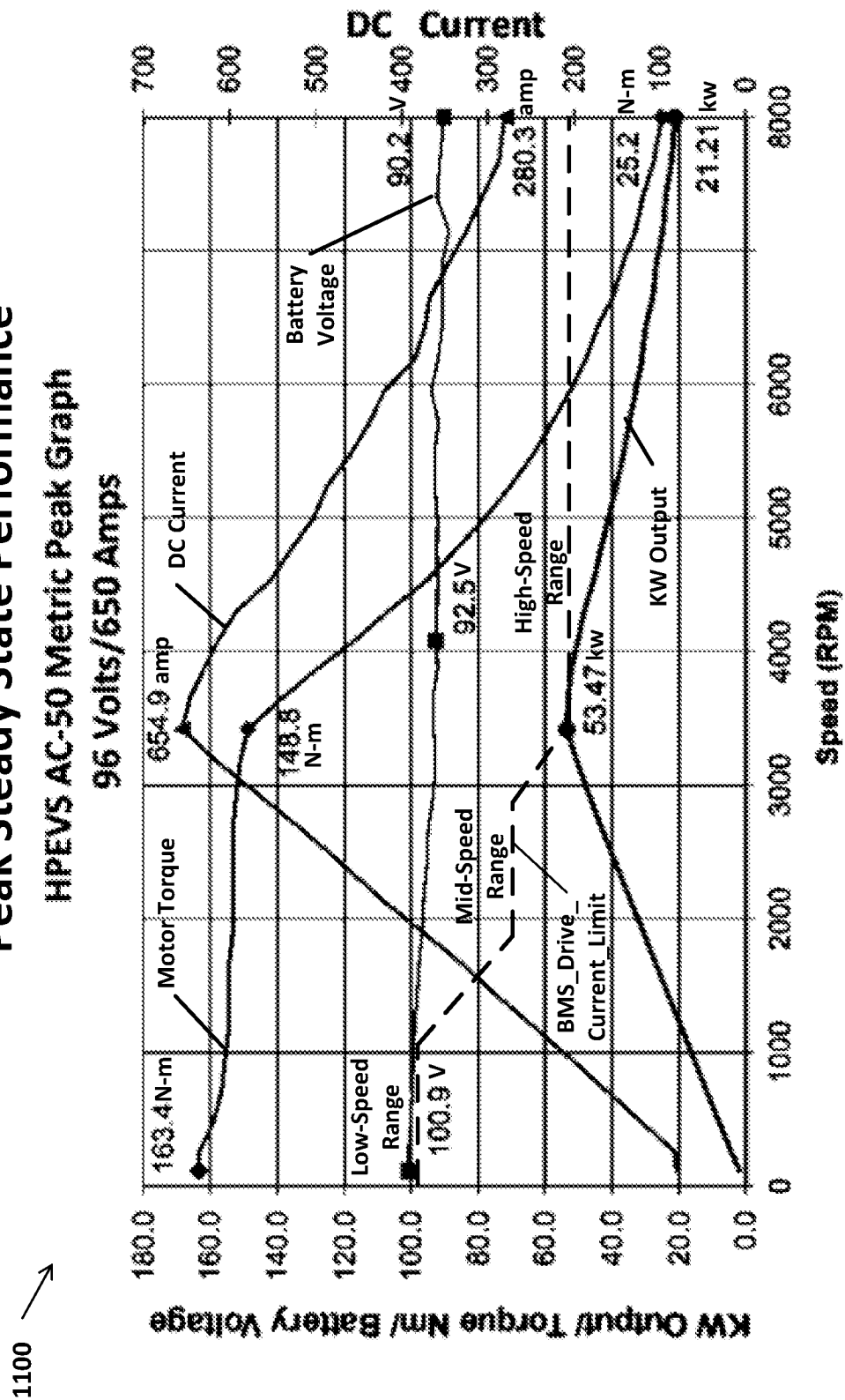
FIG. 11 illustrates a graph of the steady state maximum performance characteristics of a drive motor.

FIG. 11 shows a graph 1100 of the steady state maximum performance characteristics of a typical drive motor, such as drive motor 104, that may be used in some implementations. The performance curve illustrated in the example of graph 1100 is for a 3-phase AC induction motor manufactured by HPEVS, as one possible example of the drive motor 104. Other types of drive motors such as a surface permanent magnet or other types of traction motors may also be used.

As shown in FIG. 11, the drive motor 104 may provide substantially constant torque of about 155 N-m accelerating from zero speed to about 3300 rpm. The DC current drawn from battery pack 106 in this same interval increases from about 100 amps at zero speed until 655 amps at 3300 rpm. At speeds higher than 3300 rpm the motor 'sees' full battery voltage, and the motor controller 102 enters the field-weakening region where the motor torque produced by drive motor 104 begins to decrease.

Even though a large battery can supply the high discharge currents involved, it may be beneficial in many applications to limit vehicle performance at moderate to high vehicle speeds in order to increase the operating range of the vehicle.

Accordingly, graph 1100 of FIG. 11 is also overlain with a dashed line indicating a maximum RMS drive current that may be imposed by the motor controller 102, similar to the graph 500 shown in FIG. 5. In the graph 1100, three speed ranges are included: a low-speed range, a mid-speed range, and a high-speed range. These are separated by two respective transition ranges. Similarly, the parameters of the drive current limit for each of the three speed ranges may be mapped to the maximum discharge current in curves similar to those shown in FIGS. 6 and 7. Thus, the RMS drive current limit may be adjusted accordingly to provide a relatively high propulsion torque in the low-speed range, to provide reduced battery pack discharge current in the mid-speed range, and further reduced battery discharge current in the high-speed range, thereby extending the range of battery pack 106 in all three ranges. The embodiment described with respect to FIG. 11 may provide various other advantages as well.

C. VCL Code

As noted above, motor controller 102 may control various functions related to the operation of vehicle 100, including functions related to generating an RMS drive current from a direct battery discharge current received from BMS 108. At a high level, motor controller 102 may include a computing device that may be configured to obtain inputs (e.g., periodically), execute a control loop and other functions based on the obtained inputs, and generate one or more outputs based on the output of the executed functions.

Further, all CANbus communications, function evaluations, map computations, etc. may be executed in the background and run continuously. All functions that deal with processing information sent over the CANbus from BMS 108 are handled in a BMS_Control module. This includes handling and processing of fault messages and exception states as well as dealing with other performance limits that may be imposed.

Below is a section of pseudocode that illustrates one possible example of a control loop for controlling RMS drive current and voltage. At a high level, the control loop is an outermost or top-level loop that executes repeatedly, for instance, approximately 200-300 times per second. The example control loop may be written in VCL (Vehicle Control Language) that is executable by a motor controller 102 such as, for example, a Curtis motor controller. It should be understood that the VCL code may be stored in various types of non-transitory computer-readable media, such as non-volatile random access memory (NVRAM), flash memory, electrically erasable programmable read-only memory (EEPROM), disk memory, phase change memory, or the like.

```
MainLoop:
    Enter BMS_Control              ;Checks status of BMS messages and determines value of
                                   ;of the RMS current limits
    Enter VehicleControl_T4        ;Checks status of Driver Controls and determines the percent
                                   ;of the maximum RMS Current to be supplied/absorbed by
                                   ;motor and controller
    Call Handle_Drive_Current_Limit;Sets drive current and regen current limits
    Goto MainLoop
```

At a high level, the main control loop calls three subroutines: (1) a battery management system control subroutine (BMS_Control), as noted above, (2) a vehicle control subroutine (VehicleControl_T4), and (3) a drive current limit handling subroutine (Handle_Drive_Current_Limit). The main control loop shown above is but one example and may include more or fewer function calls or take various other forms as well.

The VehicleControl_T4 subroutine handles functions that deal with processing information from the vehicle and driver controls 110. The functions carried out in this module deal with handling of the throttle commands that control the actual torque provided or absorbed by drive motor, various safety functions, forward and reverse handling and other functions normally required to operate a vehicle safely. For example, the section of pseudocode below illustrates one possible example of VCL code that may be executed when the VehicleControl_T4 subroutine is executed, and which controls RMS drive current limit in the various speed ranges as described above. The following discussion of the pseudocode shown below is generally consistent with FIG. 5 and the associated description.

```
if (AllowSmoothBoostTransitions = ON)
  begin    ;Begin Smooth Transitions Logic
    if (ABS_Motor_RPM <= P_User40)
      begin                                    ;Low Speed Boost MAP2 Output
        BoostTrackingCode = 2
        BMS_Drive_Current_Limit = DCL_BoostControlMap_Output ; Low Speed BoostControl Map2
        BMS_Regen_Current_Limit = CCL_CurrentReductionMap_Output;
      end;
    else if (ABS_Motor_RPM < P_User41)
      begin                                    ;Transition Range Interpolation
        BoostTrackingCode = 3
        BMS_Drive_Current_Limit = MAP_TWO_POINTS(ABS_Motor_RPM,P_User40,P_User41,MAP2_Output,MAP3_Output);
```

```
            BMS_Regen_Current_Limit = CCL_CurrentReductionMap_Output;
        end
    else    ;   (ABS_Motor_RPM >= P_User41)
        begin
            BoostTrackingCode = 4                           ;HiSpeed Range MAP3 Output
            BMS_Drive_Current_Limit = DCL_CurrentReductionMap_Output;
            BMS_Regen_Current_Limit = CCL_CurrentReductionMap_Output;
        end
end         ;End Smooth Transitions Logic
```

The pseudocode above, when executed, may cause motor controller 102 to select a map that is associated one of two speed ranges (a low-speed range, or a high speed), or the transitional range, based on the rotational speed of drive motor 104 (indicated by the variable ABS_MOTOR_RPM). After selecting a given map or the transition range, the motor controller 102 then determines the RMS drive current limit using the map associated with the selected speed range, or by interpolating between the two.

For example, if the speed of the drive motor 104 is less than or equal to the variable P_User40 (1000 rpm in the example of FIG. 5) the motor controller 102 sets the BMS_Drive_Current_Limit variable equal the value from the low-speed range map based on the maximum direct battery discharge current (as indicated by the input variable OrionPackDCL) as described above with respect to FIG. 6.

Alternatively, if the speed of the drive motor 104 is greater than or equal to the value of P_User41 (1800 rpm in the example of FIG. 5) motor controller 102 sets the BMS_Drive_Current_Limit variable equal to the value from the high-speed range map based on the maximum direct battery discharge current (as indicated by the input variable OrionPackDCL) as described above with respect to FIG. 7.

Also, as described above, the OrionPackDCL value as reported to motor controller 102 by BMS 108 may change periodically. In response to determining that the value of OrionPackDCL has changed (e.g., via an updated value being received via the CANbus), motor controller 102 may update the values of the maps, and then update the value of BMS_Drive_Current_Limit accordingly.

If the speed of the drive motor 104 is greater than P_User40 but less than P_User41, motor controller 102 may determine the value of BMS_Drive_Current_Limit by linear interpolation using the VCL-provided function, MAP_TWO_POINTS. The endpoints for the linear interpolation of the independent variable on the x-axis are the fixed-speed points P_User40 and P_User41. The points on the dependent y-axis are the variables Map2_Output and Map3_Output which, in turn, are functions of the value of the OrionPackDCL variable. Examples of linear interpolation in the transition range can be seen, by way of example, in FIG. 8 and FIG. 9. The MAP_TWO_POINTS function is but one example of a mathematical function that may be used to linearly interpolate between two points.

The third subroutine of the main control loop, Handle_Drive_Current_Limit, handles functions that deal with the final assignment of the RMS drive current limit that is to be carried out by the motor controller 102. For example, the section of pseudocode below illustrates one possible example of VCL code that may be executed when the Handle_Drive_Current_Limit subroutine is executed.

```
Handle_Drive_Current_Limit:
    Drive_Current_Limit = BMS_Drive_Current_Limit    ;Limits maximum value of RMS phase current
    ;
    return
```

As shown above, Drive_Current_Limit, which may be the ultimate variable that enforces the drive current limit on the drive motor 104, may be set to the value of BMS_Drive_Current_Limit that was determined from the VehicleControl_T4 subroutine.

In addition, while examples of VCL code that may be used to implement the techniques of this disclosure have been described, it should be understood that various other programming languages and code may also be used to implement the techniques of this disclosure.

Figure 12:
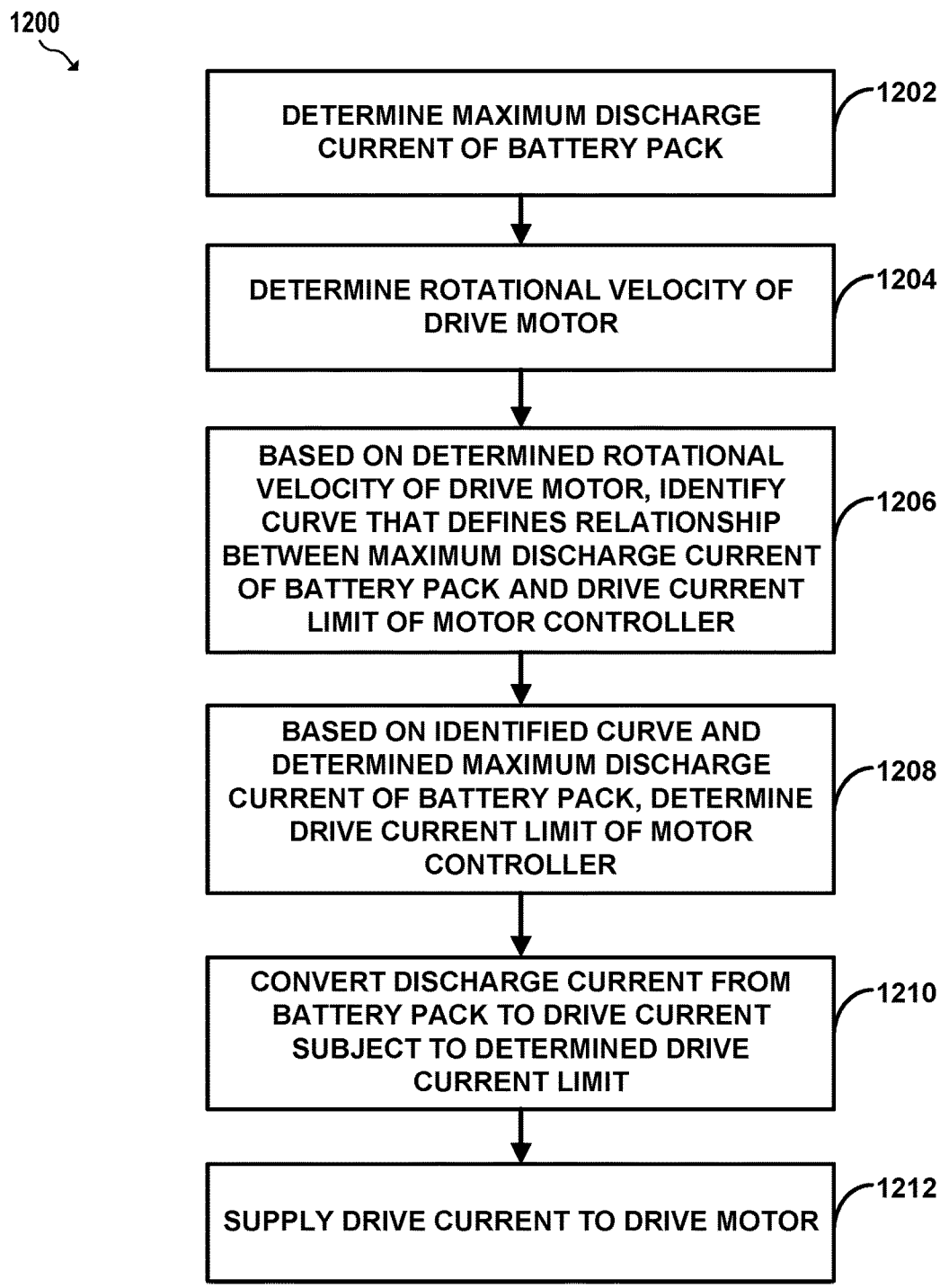
FIG. 12 is a flowchart illustrating a method for operating a motor controller of a vehicle, according to an example implementation.

Turning now to FIG. 12, a flowchart is shown illustrating a method 1200 for operating a motor controller of a vehicle according to some of the examples discussed herein. The method 1200 begins at block 1202 wherein a motor controller, such as the motor controller 102, may determine the maximum discharge current from the battery pack 106. This value may be read from the CANbus as reported by the BMS 108, as discussed above, and may be represented by the variable OrionPackDCL.

At block 1204, the motor controller 102 may determine a rotational velocity of the drive motor 104. For example, the speed of the drive motor 104 may be read into the Curtis variable ABS_Motor_RPM. The speed of the drive motor 104 may be reported to the motor controller 102 by a conventional shaft speed encoder or a quadrature encoder connected to appropriate terminals of the motor controller 102. Other possibilities also exist.

At block 1206, the motor controller 102 may, based on the determined rotational velocity of the drive motor 104, identify a curve that defines a relationship between the maximum discharge current of the battery pack 106 and a drive current limit of the motor controller 102. As discussed above, if the motor controller 102 determines that the drive motor 104 is operating in the low-speed range, the motor controller 102 may identify the curve shown in FIG. 6, which defines a relationship between the maximum discharge current of the battery pack 106 and the RMS drive current limit of the motor controller 102.

At block 1208, the motor controller 102 may, based on the identified curve and the determined maximum discharge current of the battery pack 106, determine the drive current limit of the motor controller 102. For example, the motor controller 102 may use the determined maximum discharge current of the battery pack 106 as an input for the identified curve, which may map to an output value that indicates the drive current limit to be used by the motor controller 102.

At block 1210, the motor controller 102 may convert a discharge current from the battery pack to a drive current subject to the determined drive current limit. For instance, as discussed above, the motor controller 102 may determine an indication of a position of an accelerator pedal of the vehicle. The position of the accelerator pedal may correspond to a drive current requested by the operator of the vehicle. The motor controller 102 may convert the discharge current from the battery pack to the drive current based on the indication of the position of the accelerator pedal, but may limit the requested drive current accordingly if it exceeds the determined drive current limit.

At block 1212, the motor controller 102 may supply the drive current to the drive motor 104. In some implementations, if the requested drive current based on the position of the accelerator pedal complies with the determined drive current limit (e.g., it is below the limit), then the motor controller may supply the requested drive current. Alternatively, the motor controller 102 may supply a drive current to the drive motor 104 that is equal to the drive current limit, if the requested drive current exceeded the limit.

As noted above, the motor controller 102 may execute some or all of the blocks of method 1200 repeatedly, for instance, in a loop. In some implementations, the method 1200 may include more or fewer blocks, which may occur in orders other than those specified with respect to FIG. 12.

Various implementations and examples associated with the present embodiment related to providing and controlling drive current in a vehicle motor have been described. However, it should be understood that the present embodiment may take various other forms as well.

III. Conclusion

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

The invention claimed is:

1. A vehicle comprising:
  a drive motor;
  a battery pack:
  at least one processor;
  a non-transitory computer-readable storage medium; and
  program instructions stored on the non-transitory computer-readable storage medium that are executable by the at least one processor to cause the vehicle to:
    determine a maximum discharge current of the battery pack;
    identify a first curve that defines, for a first range of rotational velocities of the drive motor, a first relationship between the maximum discharge current of the battery pack and a first drive current limit of the vehicle;
    identify a second curve that defines, for a second range of rotational velocities of the drive motor, a second relationship between the maximum discharge current of the battery pack and a second drive current limit of the vehicle;
    determine a rotational velocity of the drive motor that is between the first range of rotational velocities and the second range of rotational velocities;
    identify an endpoint of the first curve;
    identify a starting point of the second curve;
    determine a third drive current limit based on the endpoint of the first curve and the starting point of the second curve;
    convert a discharge current from the battery pack to a drive current subject to the determined third drive current limit; and
    supply the drive current to the drive motor.

2. The vehicle of claim 1, wherein the first drive current limit comprises a percentage of a maximum drive current that the vehicle is capable of supplying to the drive motor.

3. The vehicle of claim 1, further comprising program instructions stored on the non-transitory computer-readable medium that are executable by the at least one processor such that the vehicle is configured to:
  determine an updated maximum discharge current of the battery pack; and
  based on the updated maximum discharge current of the battery pack, update the first drive current limit of the vehicle.

4. The vehicle of claim 1, further comprising program instructions stored on the non-transitory computer-readable medium that are executable by the at least one processor such that the vehicle is configured to:
  determine an updated maximum discharge current of the battery pack; and
  based on the updated maximum discharge current of the battery pack, update the second drive current limit of the vehicle.

5. The vehicle of claim 1, wherein the determined rotational velocity of the drive motor is a first rotational velocity, and wherein the vehicle further comprises program instructions stored on the non-transitory computer-readable medium that are executable by the at least one processor such that the vehicle is configured to:
  determine a second rotational velocity of the drive motor that is within the second range of rotational velocities;
  based on the second curve and the determined maximum discharge current of the battery pack, determine the second drive current limit of the vehicle;

convert a second discharge current from the battery pack to a second drive current subject to the determined second drive current limit; and supply the second drive current to the drive motor.

6. The vehicle of claim 1, wherein the program instructions that are executable by the at least one processor such that the vehicle is configured to determine the third drive current limit based on the endpoint of the first curve and the starting point of the second curve comprise program instructions that are executable by the at least one processor such that the vehicle is configured to:

determine the third drive current limit by interpolating between the endpoint of the first curve and the starting point of the second curve.

7. The vehicle of claim 1, further comprising program instructions stored on the non-transitory computer-readable medium that are executable by the at least one processor such that the vehicle is configured to:

determine one or both of the first range of rotational velocities and the second range of rotational velocities of the drive motor based on the determined maximum discharge current of the battery pack.

8. The vehicle of claim 1, further comprising program instructions stored on the non-transitory computer-readable medium that are executable by the at least one processor such that the vehicle is configured to:

determine an indication of a position of an accelerator pedal of the vehicle, wherein the program instructions that are executable by the at least one processor such that the vehicle is configured to convert the discharge current from the battery pack to the drive current subject to the determined third drive current limit comprise instructions that are executable by the at least one processor such that the vehicle is configured to:

convert the discharge current from the battery pack to the drive current based on the indication of the position of the accelerator pedal.

9. The vehicle of claim 1, wherein the at least one processor comprises at least one motor controller.

10. A motor controller comprising:

at least one processor;

a non-transitory computer-readable storage medium; and program instructions stored on the non-transitory computer-readable storage medium that are executable by the at least one processor such that the motor controller is configured to:

determine a maximum discharge current of a battery pack of a vehicle, wherein the motor controller is coupled to the battery pack and a drive motor of the vehicle;

identify a first curve that defines, for a first range of rotational velocities of the drive motor, a first relationship between the maximum discharge current of the battery pack and a first drive current limit of the motor controller;

identify a second curve that defines, for a second range of rotational velocities of the drive motor, a second relationship between the maximum discharge current of the battery pack and a second drive current limit of the motor controller;

determine a rotational velocity of the drive motor that is between the first range of rotational velocities and the second range of rotational velocities;

identify an endpoint of the first curve;

identify a starting point of the second curve;

determine a third drive current limit based on the endpoint of the first curve and the starting point of the second curve;

convert a discharge current from the battery pack to a drive current subject to the determined third drive current limit; and supply the drive current to the drive motor.

11. The motor controller of claim 10, wherein the first drive current limit comprises a percentage of a maximum drive current that the motor controller is capable of supplying to the drive motor.

12. The motor controller of claim 10, further comprising program instructions stored on the non-transitory computer-readable medium that are executable by the at least one processor such that the motor controller is configured to:

determine an updated maximum discharge current of the battery pack; and based on the updated maximum discharge current of the battery pack, update the first drive current limit of the motor controller.

13. The motor controller of claim 10, further comprising program instructions stored on the non-transitory computer-readable medium that are executable by the at least one processor such that the motor controller is configured to:

determine an updated maximum discharge current of the battery pack; and based on the updated maximum discharge current of the battery pack, update the second drive current limit of the motor controller.

14. The motor controller of claim 10, wherein the determined rotational velocity of the drive motor is a first rotational velocity, and wherein the motor controller further comprises program instructions stored on the non-transitory computer-readable medium that are executable by the at least one processor such that the motor controller is configured to:

determine a second rotational velocity of the drive motor that is within the second range of rotational velocities;

based on the second curve and the determined maximum discharge current of the battery pack, determine the second drive current limit of the motor controller;

convert a second discharge current from the battery pack to a second drive current subject to the determined second drive current limit; and supply the second drive current to the drive motor.

15. The motor controller of claim 10, wherein the program instructions that are executable by the at least one processor such that the motor controller is configured to determine the third drive current limit based on the endpoint of the first curve and the starting point of the second curve comprise program instructions that are executable by the at least one processor such that the motor controller is configured to:

determine the third drive current limit by interpolating between the endpoint of the first curve and the starting point of the second curve.

16. The motor controller of claim 10, further comprising program instructions stored on the non-transitory computer-readable medium that are executable by the at least one processor such that the motor controller is configured to:

determine one or both of the first range of rotational velocities and the second range of rotational velocities of the drive motor based on the determined maximum discharge current of the battery pack.

17. The motor controller of claim 10, further comprising program instructions stored on the non-transitory computer-readable medium that are executable by the at least one processor such that the motor controller is configured to:
   determine an indication of a position of an accelerator pedal of the vehicle, wherein the program instructions that are executable by the at least one processor such that the motor controller is configured to convert the discharge current from the battery pack to the drive current subject to the determined third drive current limit comprise instructions that are executable by the at least one processor such that the motor controller is configured to:
      convert the discharge current from the battery pack to the drive current based on the indication of the position of the accelerator pedal.

18. A non-transitory computer-readable medium, wherein the non-transitory computer-readable medium is provisioned with program instructions that, when executed by at least one processor, cause a vehicle to:
   determine a maximum discharge current of a battery pack of the vehicle;
   identify a first curve that defines, for a first range of rotational velocities of a drive motor of the vehicle, a first relationship between the maximum discharge current of the battery pack and a first drive current limit of the vehicle;
   identify a second curve that defines, for a second range of rotational velocities of the drive motor, a second relationship between the maximum discharge current of the battery pack and a second drive current limit of the vehicle;
   determine a rotational velocity of the drive motor that is between the first range of rotational velocities and the second range of rotational velocities;
   identify an endpoint of the first curve;
   identify a starting point of the second curve;
   determine a third drive current limit based on the endpoint of the first curve and the starting point of the second curve;
   convert a discharge current from the battery pack to a drive current subject to the determined third drive current limit; and
   supply the drive current to the drive motor.

19. The non-transitory computer-readable medium of claim 18, wherein the program instructions that, when executed by at least one processor, cause the vehicle to determine the third drive current limit based on the endpoint of the first curve and the starting point of the second curve comprise program instructions that, when executed by at least one processor, cause the vehicle to:
   determine the third drive current limit by interpolating between the endpoint of the first curve and the starting point of the second curve.

20. The non-transitory computer-readable medium of claim 18, wherein the non-transitory computer-readable medium is also provisioned with program instructions that, when executed by at least one processor, cause the vehicle to:
   determine one or both of the first range of rotational velocities and the second range of rotational velocities of the drive motor based on the determined maximum discharge current of the battery pack.

* * * * *